(12) United States Patent
Watanabe et al.

(10) Patent No.: US 10,484,651 B2
(45) Date of Patent: Nov. 19, 2019

(54) IMAGE DISPLAY CONTROL DEVICE

(71) Applicant: AISIN SEIKI KABUSHIKI KAISHA, Kariya-shi, Aichi-ken (JP)

(72) Inventors: Kazuya Watanabe, Anjo (JP); Takayuki Nakasho, Anjo (JP); Masahiko Sakabe, Kariya (JP)

(73) Assignee: AISIN SEIKI KABUSHIKI KAISHA, Kariya-shi, Aichi (JP)

( * ) Notice: Subject to any disclaimer, the term of this patent is extended or adjusted under 35 U.S.C. 154(b) by 0 days.

(21) Appl. No.: 15/738,681

(22) PCT Filed: Jun. 23, 2016

(86) PCT No.: PCT/JP2016/068731
§ 371 (c)(1),
(2) Date: Dec. 21, 2017

(87) PCT Pub. No.: WO2017/002708
PCT Pub. Date: Jan. 5, 2017

(65) Prior Publication Data
US 2018/0192005 A1   Jul. 5, 2018

(30) Foreign Application Priority Data
Jun. 29, 2015   (JP) .................................. 2015-130276

(51) Int. Cl.
*H04N 7/18*   (2006.01)
*B60R 1/00*   (2006.01)
(Continued)

(52) U.S. Cl.
CPC ............... *H04N 7/181* (2013.01); *B60R 1/00* (2013.01); *G06K 9/00771* (2013.01);
(Continued)

(58) Field of Classification Search
CPC ...... H04N 7/181; H04N 5/44504; B60R 1/00; G06K 9/00771; G06K 9/00791
See application file for complete search history.

(56) References Cited

U.S. PATENT DOCUMENTS

2009/0059006 A1   3/2009  Hattori et al.
2009/0273720 A1*  11/2009  Tanaka .............. G02F 1/133512
                                                       348/790
(Continued)

FOREIGN PATENT DOCUMENTS

JP       2005-150938 A    6/2005
JP       2005-170285 A    6/2005
(Continued)

OTHER PUBLICATIONS

International Search Report for PCT/JP2016/068731, dated Sep. 6, 2016.
(Continued)

*Primary Examiner* — Thai Q Tran
*Assistant Examiner* — Jose M Mesa
(74) *Attorney, Agent, or Firm* — Sughrue Mion, PLLC

(57) ABSTRACT

An image display control device according to an embodiment includes a display and a controller. The controller displays a first screen on the display. The first screen includes a first image and a second image. The first image is and image of a vehicle viewed from above. The second image is obtained by capturing a second area that is a part of a first area where is a capturing target around the vehicle. The controller displays, on the display, a third image that is switched from the second image, the third image. The third image is obtained by capturing a third area where is different from the second area. The third is selected as a part of area included in the first area. The controller displays identification information for identifying the third area within the first (Continued)

image, before the second image is switched to the third image.

6 Claims, 21 Drawing Sheets

(51) Int. Cl.
*G09G 5/14* (2006.01)
*G09G 5/36* (2006.01)
*G06K 9/00* (2006.01)
*H04N 5/445* (2011.01)

(52) U.S. Cl.
CPC ........... *G06K 9/00791* (2013.01); *G09G 5/14* (2013.01); *G09G 5/36* (2013.01); *H04N 5/44504* (2013.01); *H04N 5/44591* (2013.01); *H04N 7/18* (2013.01); *B60R 2300/105* (2013.01); *B60R 2300/303* (2013.01); *B60R 2300/607* (2013.01); *G09G 2354/00* (2013.01); *G09G 2370/20* (2013.01); *G09G 2380/10* (2013.01)

(56) References Cited

U.S. PATENT DOCUMENTS

| | | | |
|---|---|---|---|
| 2011/0063444 A1* | 3/2011 | Okamoto | B60R 1/00 348/148 |
| 2012/0002050 A1* | 1/2012 | Taniguchi | H04N 7/181 348/148 |

FOREIGN PATENT DOCUMENTS

| | | |
|---|---|---|
| JP | 2007-210451 A | 8/2007 |
| JP | 2008-017311 A | 1/2008 |
| JP | 2008-21234 A | 1/2008 |
| JP | 2008-024138 A | 2/2008 |
| JP | 2009-117971 A | 5/2009 |
| JP | 2009-239674 A | 10/2009 |
| JP | 2010-147516 A | 7/2010 |

OTHER PUBLICATIONS

Communication dated May 4, 2018, from European Patent Office in counterpart application No. 16817816.8.

* cited by examiner

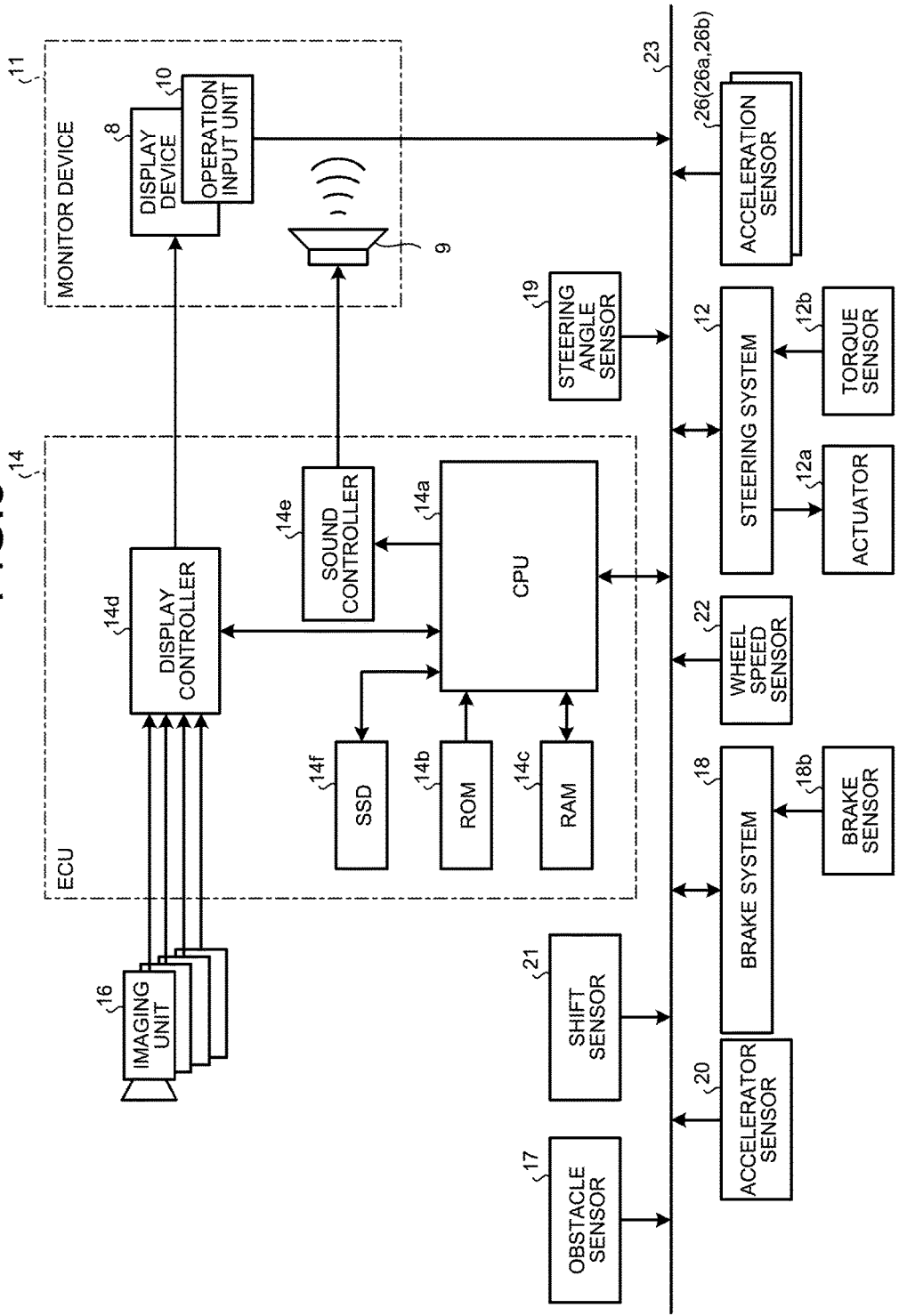

IMAGE DISPLAY CONTROL DEVICE

CROSS REFERENCE TO RELATED APPLICATIONS

This application is national stage application of International Application No. PCT/JP2016/068731, filed Jun. 23, 2016, which designates the United States, incorporated herein by reference, and which claims the benefit of priority from Japanese Patent Application No. 2015-130276, filed Jun. 29, 2015, the entire contents of which are incorporated herein by reference.

TECHNICAL FIELD

Embodiments of the present invention relates to an image display control device.

BACKGROUND ART

Conventionally, there is a technology for making a user intuitively recognize which area of a plurality of images is displayed that obtained by capturing by a plurality of cameras (hereinafter, referred to as camera images) mounted so as to be able to capture a plurality of areas around the vehicle, by displaying a camera image of an area selected by the user and an image of the vehicle viewed from above (hereinafter, referred to as a bird's eye view image) in an associated manner.

CITATION LIST

Patent Literature

Patent Document 1: Japanese Patent Application Laid-open No. 2008-17311

SUMMARY OF INVENTION

Problem to be Solved by the Invention

However, in the technology disclosed in Patent Document 1, regardless of manual or automatic, it has been difficult for a user to identify which area of the camera image to be switched is going to be displayed, when the user does not recognize which area of the camera image is going to be displayed. For example, when camera images are switched in a predetermined order every time the user presses a certain button, or when camera images are switched on the basis of a traveling state of the vehicle, the user needs to recognize to which area the camera image is switched, by confirming the bird's eye view image and the camera image, after the camera image is switched.

Means for Solving Problem

An image display control device of an embodiment includes a display and a controller. The controller displays a first screen on the display. The first screen includes a first image and a second image. The first image is an image of a vehicle viewed from above. The second image is obtained by capturing a second area that is a part of a first area where is a capturing target around the vehicle. The controller displays, on the display, a third image that is switched from the second image. The third image is obtained by capturing a third area where is different from the second area. The third area is selected as a part of area included in the first area. The controller displays identification information for identifying the third area within the first image, before the second image is switched to the third image. Consequently, for example, a user can easily identify which area of the next image is going to be displayed, by displaying identification information during the time until the second image is switched to the third image.

In the image display control device of the embodiment, the controller keeps displaying the first image on the first screen and displays a black image instead of the second image prior to the third image during a time until the second image is switched to the third image. Consequently, for example, it is possible to prevent the user from being incapable of recognizing whether the second image is switched to the third image by a disappearance of the first image while the second image is switched to the third image.

In the image display control device of the embodiment, the controller gradually reduces brightness of the second image until the black image is displayed, and gradually increases brightness of the third image after the black image is displayed. Consequently, for example, it is possible to prevent the user from being incapable of recognizing whether the second image is switched to the third image by a disappearance of the first image while the second image is switched to the third image. Moreover, the user can easily recognize whether the second image is switched to the third image.

In the image display control device of the embodiment, the identification information is information to be displayed in an area of the first image corresponding to the third area in an overlapping manner. Consequently, for example, the user can easily recognize which area of the next image is going to be displayed, in the areas included in the first area.

In the image display control device of the embodiment, the controller changes the identification information into a display-hidden state at a same time when the second image is switched to the third image or at a time when a predetermined time has elapsed after the second image is switched to the third image. Consequently, for example, the user can easily recognize that the second image has switched to the third image.

BRIEF DESCRIPTION OF DRAWINGS

FIG. 1 is a perspective view illustrating an example of a state in which a part of a vehicle according to a first embodiment is seen through;

FIG. 3 is a block diagram illustrating an example of a functional configuration of the vehicle according to the first embodiment;

DESCRIPTION OF EMBODIMENTS

Exemplary embodiments of an image display control device mounted on a vehicle will now be described in detail with reference to the accompanying drawings.

First Embodiment

Figure 1:
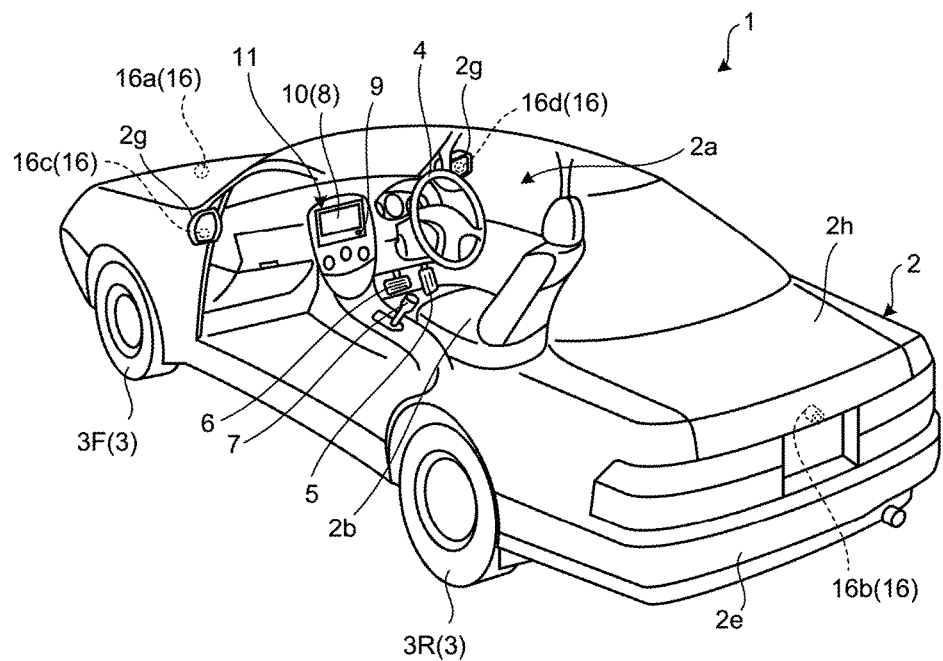
Figure 2:
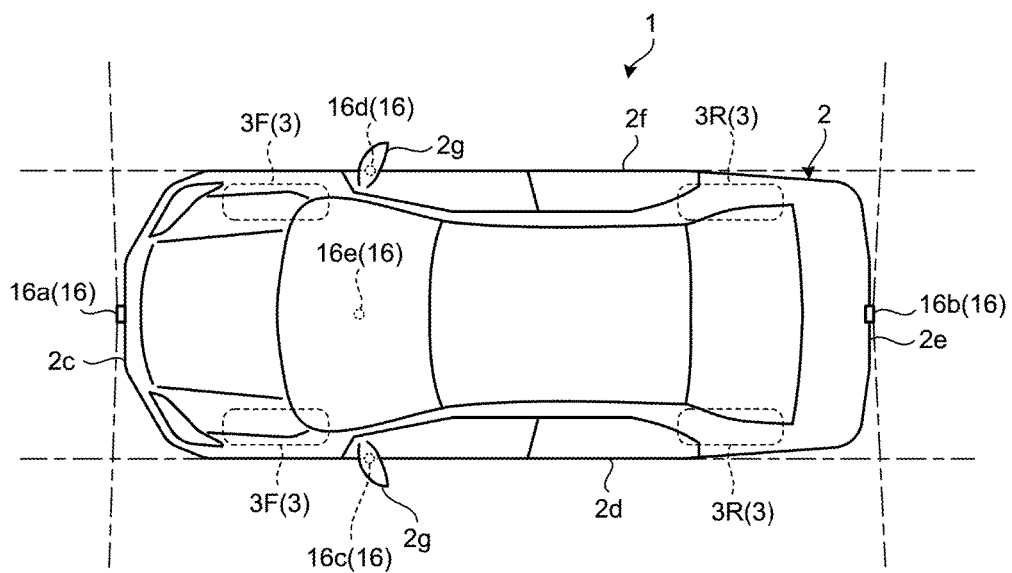
FIG. 2 is a plan view illustrating an example of the vehicle according to the first embodiment.

First, a schematic configuration of a vehicle mounted with an image display control device according to the present embodiment will be described with reference to FIGS. 1 and 2. FIG. 1 is a perspective view illustrating an example of a state in which a part of a vehicle according to a first embodiment is seen through. FIG. 2 is a plan view illustrating an example of the vehicle according to the first embodiment.

As illustrated in FIG. 1, a vehicle 1 according to the present embodiment includes a passenger compartment 2a in which a user, who is not illustrated, gets on. A steering unit 4, an acceleration operating unit 5, a brake operating unit 6, a speed-change operating unit 7, and the like are provided in the passenger compartment 2a, in a state that a driver, who is the user, can operate the steering unit 4, the acceleration operating unit 5, the brake operating unit 6, the speed-change operating unit 7, and the like from a seat 2b.

The steering unit 4 is a steering wheel projecting from a dashboard (instrument panel). The acceleration operating unit 5 is an accelerator pedal located at the foot of the driver. The brake operating unit 6 is a brake pedal located at the foot of the driver. The speed-change operating unit 7 is a shift lever projecting from a center console.

A monitor device 11 including a display device 8 (an example of a display) and a sound output device 9 that includes a speaker and the like and that can output various types of sound information is also provided in the passenger compartment 2a. The monitor device 11 is provided at the center portion of the dashboard in the passenger compartment 2a in a vehicle width direction (lateral direction). The display device 8 includes a liquid crystal display (LCD), an organic electroluminescent display (OELD), and the like. The display device 8 is a display that can display various types of information such as a screen (hereinafter, referred to as a vehicle periphery monitoring screen G1 (see FIGS. 4A to 4D)) including captured images around the vehicle 1 and an image of the vehicle 1 viewed from above (what is called a bird's eye view image g1 (see FIGS. 4A to 4D)).

In the present embodiment, the display device 8 includes a transparent operation input unit 10 (what is called a touch panel) that is provided on the display screen and that detects a touch operation on the display screen. The user can view an image displayed on the display screen of the display device 8. The user can also input various types of operation information, by touching a display position of the image displayed on the display screen of the display device 8 with a finger or the like.

The monitor device 11 may also include various operation units such as a switch, a dial, a joystick, and a push button. Another sound output device may also be provided in the passenger compartment 2a at a position different from the position at which the monitor device 11 is provided. In this case, various types of sound information can be output from both the sound output device 9 and the other sound output device. In the present embodiment, the monitor device 11 can also display information on various systems such as a navigation system and an audio system in addition to the vehicle periphery monitoring screen G1 (see FIGS. 4A to 4D). However, a display capable of displaying the vehicle periphery monitoring screen G1 (see FIGS. 4A to 4D) may be separately provided from the monitor device 11.

In the present embodiment, as illustrated in FIGS. 1 and 2, the vehicle 1 is a four-wheeled vehicle (four-wheeled automobile), and has two front wheels 3F at the left and right sides, and two rear wheels 3R at the left and right sides. A side slip angle of the front wheels 3F changes (turns) depending on the steering of the steering unit 4 (steering wheel). A steering system 12 (see FIG. 3) is an electric power steering system, a steer by wire (SBW) system, and the like. The steering system 12 steers the front wheels 3F, by adding torque (assist torque) to the steering unit 4 using an actuator 12a (see FIG. 3) so as to supplement the steering force.

As illustrated in FIG. 2, the vehicle 1 (vehicle body 2) also includes a plurality of (five in the present embodiment) imaging units 16a, 16b, 16c, 16d, and 16e (hereinafter, referred to as an imaging unit 16 when the imaging units 16a, 16b, 16c, 16d, and 16e need not be distinguished from one another). The imaging units 16a, 16b, 16c, 16d, and 16e are capable of capturing images of a plurality areas around the vehicle 1 (in the present embodiment, the front of the vehicle 1, the rear of the vehicle 1, the left of the vehicle 1 in the vehicle width direction, the right of the vehicle 1 in the vehicle width direction, and under the floor of the vehicle 1). The imaging unit 16 is what is called a digital camera including an imaging device such as a charge coupled device (CCD), a complementary metal oxide semiconductor (CMOS) image sensor (CIS), and the like.

In the present embodiment, the imaging unit 16 captures images of areas around the vehicle 1 at a predetermined frame rate, and outputs image data of the captured images (frame images constituting a moving image). In the present embodiment, the imaging unit 16 also includes a wide-angle lens, thereby capturing images of an area within a range of angles viewed from 140 degrees to 220 degrees in a horizontal direction. The optical axis of each of the imaging units 16a, 16b, 16c, and 16d is provided so as to be directed to the lower side of the vehicle 1. Thus, the imaging units 16a, 16b, 16c, and 16d can capture images of the road surface on which the vehicle 1 is moving and an area above the road surface (outside environment). The optical axis of the imaging unit 16e is provided so as to be directed to the lower side of the vehicle 1, and can capture images of the road surface on which the vehicle 1 is moving.

More specifically, the imaging unit 16a is provided on an end 2c at the front side of the vehicle body 2 (for example, at the front grille) and can capture images of the area in front of the vehicle 1. The imaging unit 16b is provided on an end 2e at the rear side of the vehicle body 2 (for example, at a rear trunk door 2h), and can capture images of the area behind the vehicle 1. The imaging unit 16c is provided on an end 2d at the left side of the vehicle body 2 in the vehicle width direction (for example, at a door mirror 2g at the left side), and can capture images of the area at the left side of the vehicle 1. The imaging unit 16d is provided on an end 2f at the right side of the vehicle body 2 in the vehicle width direction (for example, at the door mirror 2g at the right side), and can capture images of the area at the right side of the vehicle 1. The imaging unit 16e is provided under the floor of the vehicle 1, and can capture images of the road surface on which the vehicle 1 is moving.

Next, a functional configuration of the vehicle 1 according to the present embodiment will be described with reference to FIG. 3. FIG. 3 is a block diagram illustrating an example of a functional configuration of the vehicle according to the first embodiment.

As illustrated in FIG. 3, the vehicle 1 according to the present embodiment includes the monitor device 11, the steering system 12, the actuator 12a, a torque sensor 12b, an electronic control unit (ECU) 14, an obstacle sensor 17, a brake system 18, a brake sensor 18b, a steering angle sensor 19, an accelerator sensor 20, a shift sensor 21, and a wheel speed sensor 22. The monitor device 11, the steering system 12, the ECU 14, the obstacle sensor 17, the brake system 18, the accelerator sensor 20, the shift sensor 21, and the wheel speed sensor 22 are electrically connected via an electric communication line (hereinafter, referred to as an in-vehicle network 23). For example, the in-vehicle network 23 includes a controller area network (CAN).

In the present embodiment, the vehicle 1 includes two acceleration sensors 26 (26a and 26b). In the present embodiment, the vehicle 1 is a vehicle mounted with an electronic stability control (ESC), and executes the ESC on the basis of the detection results of the acceleration speeds of the vehicle 1 in the longitudinal and lateral directions obtained by the acceleration sensors 26a and 26b.

The ECU 14 executes an imaging process on the image data obtained from images captured by the imaging unit 16, and displays image data on which the imaging process is performed, on the display device 8. The ECU 14 also controls the units such as the steering system 12 and the brake system 18, by transmitting control signals to the units in the vehicle 1 through the in-vehicle network 23. The ECU 14 also acquires the detection results of the torque sensor 12b, the obstacle sensor 17, the brake sensor 18b, the steering angle sensor 19, the accelerator sensor 20, the shift sensor 21, the wheel speed sensor 22, the acceleration sensor 26, and the like through the in-vehicle network 23. The ECU 14 further acquires operation information input by the user, using the operation input unit 10.

More specifically, the ECU 14 includes a central processing unit (CPU) 14a, a read only memory (ROM) 14b, a random access memory (RAM) 14c, a display controller 14d, a sound controller 14e, a solid state drive (SSD) 14f, and the like. The CPU 14a is a controller that controls the entire vehicle 1, and executes various processes such as a process of acquiring a moving route of the vehicle 1, a process of determining whether interference with an object is present, and the like. The CPU 14a reads out a computer program stored in a non-volatile storage device such as the ROM 14b and the SSD 14f, and executes various processes on the basis of the computer program. The RAM 14c is used as a work area when the CPU 14a executes various processes on the basis of the computer program, and temporarily stores therein data used for the various processes executed by the CPU 14a.

The display controller 14d executes an imaging process on image data to be displayed on the display device 8 (for example, image data obtained from images captured by the imaging unit 16), a displaying process of the image data on the display device 8, and the like. The sound controller 14e executes a process of outputting sound data such as sound from the sound output device 9 and the like. The SSD 14f is a non-volatile storage that can rewrite various types of data, and holds the various types of data even if the power source of the ECU 14 is turned off.

In the present embodiment, the CPU 14a, the ROM 14b, and the RAM 14c are mounted on a single integrated circuit. The ECU 14 may also include a processor such as a digital signal processor (DSP) and a logic circuit instead of the CPU 14a, as the controller for controlling the entire vehicle 1. In the present embodiment, the SSD 14f is used as the main storage device for storing computer programs and the like executed by the CPU 14a. However, it is not limited thereto, and for example, a hard disk drive (HDD) and the like may also be used as the main storage device. In the present embodiment, the ECU 14 includes the SSD 14f or the HDD as the main storage device. However, it is not limited thereto, and an external device of the ECU 14 may include the SSD 14f or the HDD.

Next, a displaying process of the vehicle periphery monitoring screen G1 by the vehicle 1 according to the present embodiment will be described with reference to FIGS. 4A to 4D and FIGS. 5A and 5D. FIGS. 4A to 4D and FIGS. 5A and 5D are diagrams for explaining examples of a switching process of a captured image within a vehicle periphery monitoring screen to be displayed in the vehicle according to the first embodiment.

Figure 4A:
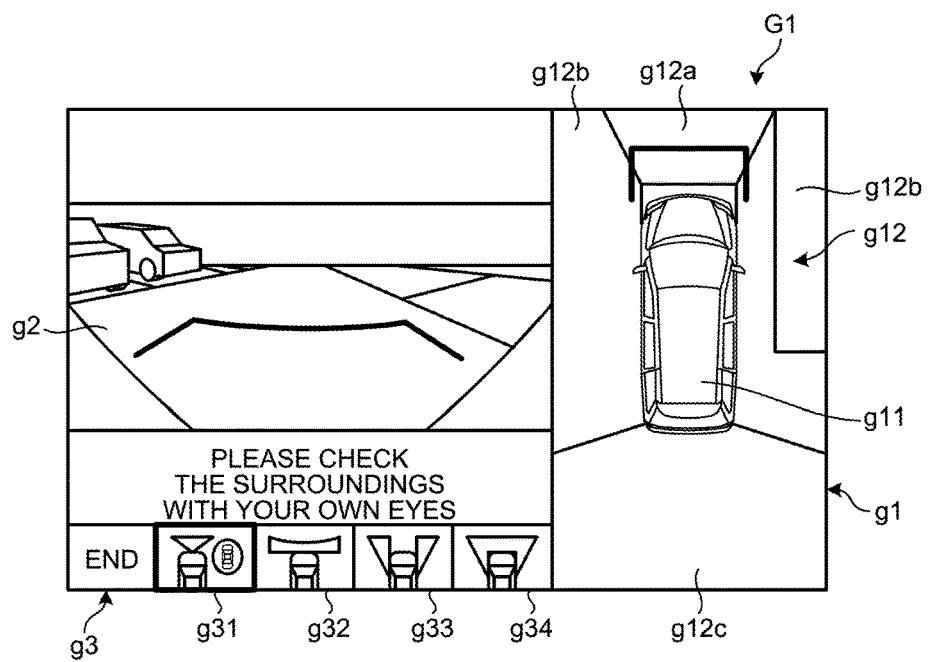
FIG. 4A is a diagram for explaining an example of a switching process of a captured image within a vehicle periphery monitoring screen to be displayed in the vehicle according to the first embodiment.

In the present embodiment, when the operation input unit 10 is operated and operation information for instructing to display the vehicle periphery monitoring screen G1 is input, the CPU 14a (an example of the controller) displays the vehicle periphery monitoring screen G1 illustrated in FIG. 4A on the display device 8. As illustrated in FIG. 4A, the vehicle periphery monitoring screen G1 (an example of a first screen) includes the bird's eye view image g1 (an example of a first image), a captured image g2 (an example of a second image), and selection images g3. The bird's eye view image g1 is an image of the vehicle 1 viewed from above. The captured image g2 is an image of an area (an example of a second area; in the present embodiment, a front area that is an area in front of the vehicle 1, a wide-angle area that is an area wider than the front area, side areas that are left and right areas of the vehicle 1 in the vehicle width direction, or an under-floor area that is an area under the floor of the vehicle 1) of a part of the area around the vehicle 1 (an example of a first area) the images of which are captured by the imaging unit 16. Each of the selection images g3 provides a graphic user interface (GUI) for selecting the area to be displayed as the captured image g2 in the areas around the vehicle 1 the images of which are to be captured.

In the present embodiment, as illustrated in FIG. 4A, the bird's eye view image g1 includes a vehicle image g11 of the vehicle 1 viewed from above and a peripheral image g12 of the area around the vehicle 1 viewed from above. The CPU 14a generates a peripheral image g12a that is obtained by converting an image captured by the imaging unit 16a to an image of the front area viewed from above (what is called viewpoint conversion). The CPU 14a also generates a peripheral image g12b that is obtained by converting two images captured by the imaging units 16c and 16d to an image of the left side area and the right side area viewed from above. Moreover, the CPU 14a generates a peripheral image g12c that is obtained by converting an image captured by the imaging unit 16b to an image of the rear area of the vehicle 1 viewed from above. The CPU 14a then acquires the peripheral image g12 that is an image obtained by combining the peripheral image g12a, the peripheral image g12b, and the peripheral image g12c.

In the present embodiment, as illustrated in FIG. 4A, when operation information for instructing to display the vehicle periphery monitoring screen G1 is input, the CPU 14a first uses the image of the front area captured by the imaging unit 16, for the captured image g2 to be included in the vehicle periphery monitoring screen G1.

Moreover, in the present embodiment, as illustrated in FIG. 4A, the CPU 14a includes a selection image g31, a selection image g32, a selection image g33, and a selection image g34 in the vehicle periphery monitoring screen G1 as the selection images g3. The selection image g31 selects the front area to be displayed as the captured image g2. The selection image g32 selects the wide-angle area to be displayed as the captured image g2. The selection image g33 selects the side areas to be displayed as the captured image g2. The selection image g34 selects the under-floor area to be displayed as the captured image g2. In the present embodiment, the CPU 14a includes the selection images g3 in the vehicle periphery monitoring screen G1. However, the vehicle periphery monitoring screen G1 may at least include the bird's eye view image g1 and the captured image g2.

In this example, an operation of switching the captured image g2 using the selection images g3 will be described. When a touch operation on one of the selection images g3 is detected by the operation input unit 10, and operation information indicating the area (hereinafter, referred to as a selection area; for example, the side areas) selected by the user using one of the selection images g3 is input, the CPU 14a specifies the selection area that is a part included in the areas around the vehicle 1 the images of which are to be captured and that is selected by the user (an example of a third area; in the present embodiment, the area indicated by the input operation information). As illustrated in FIG. 5B, the CPU 14a then switches to an post-switching image (an example of a third image) that is an image of the selection area captured by the imaging unit 16 (for example, the imaging units 16c and 16d), from a pre-switching image (an example of the second image) that is an image displayed prior to the post-switching image, on the display device 8 as the captured image g2.

Before the pre-switching image is switched to the post-switching image (in the present embodiment, during the time until the pre-switching image is switched to the post-switching image), the CPU 14a displays an identification image g13 (an example of identification information) in the bird's eye view image g1. In this process, the identification image g13 is an image for identifying the selection area selected by the user. Consequently, the identification image g13 is displayed during the time until the pre-switching image is switched to the post-switching image. Thus, the user can easily identify which area of the next image is going to be displayed. In the present embodiment, the identification image g13 is information to be displayed on the area of the bird's eye view image g1 corresponding to the selection area in an overlapping manner. Hence, the user can easily recognize which area of the next image is going to be displayed, in the areas around the vehicle 1 the images of which are to be captured. The identification image g13 of the present embodiment corresponds to the identification information.

Figure 4B:
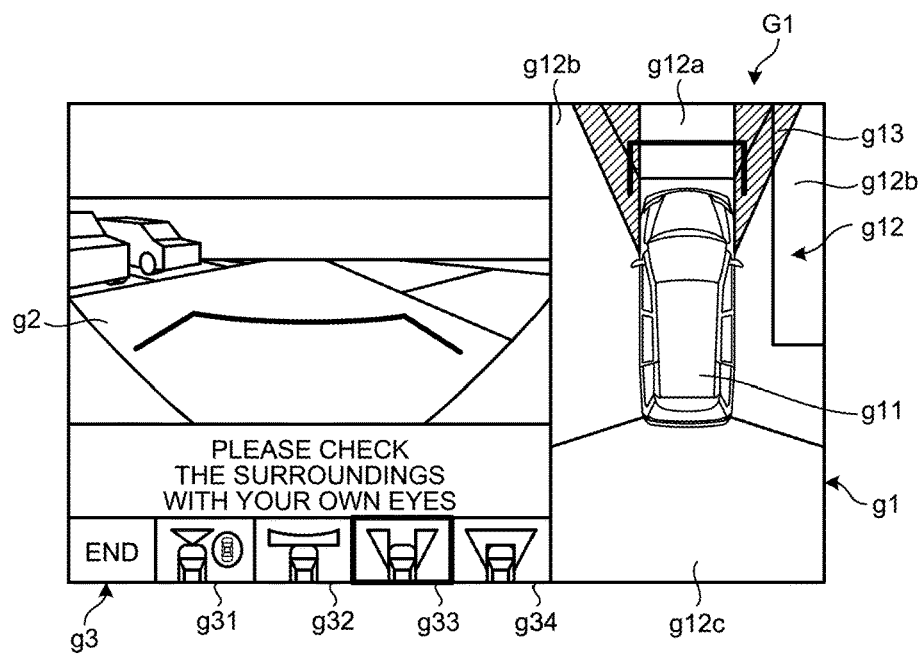
FIG. 4B is a diagram for explaining an example of the switching process of the captured image within the vehicle periphery monitoring screen to be displayed in the vehicle according to the first embodiment.

In the present embodiment, the CPU 14a displays the identification image g13 in which an area corresponding to the selection area in the peripheral image g12 included in the bird's eye view image g1 has a different display mode from that of the other area, on the bird's eye view image g1 in an overlapping manner, before the pre-switching image is switched to the post-switching image. In this process, the different display mode from that of the other area is obtained by changing the color of the area corresponding to the selection area in the peripheral image g12 from the other area, and by flickering the area corresponding to the selection area. For example, as illustrated in FIG. 4B, when a touch operation on the selection image g33 is detected and the side areas are selected as the selection area, the CPU 14a displays the identification image g13 in which the area corresponding to the side areas of the peripheral image g12b has a different display mode from that of the other area, on the bird's eye view image g1 in an overlapping manner.

In the present embodiment, the CPU 14a displays the identification image g13 in which the area corresponding to the selection area in the peripheral image g12 has a different display mode from that of the other area, on the bird's eye view image g1 in an overlapping manner. However, it is not limited thereto, as long as the identification image g13 is displayed in the bird's eye view image g1 before the pre-switching image is switched to the post-switching image. For example, the CPU 14a may display a text indicating the selection area (for example, "front area is selected" and the like) in the bird's eye view image g1 as the identification image g13. In the present embodiment, the CPU 14a displays the identification image g13 on the bird's eye view image g1 in an overlapping manner. However, to prevent an impression of not being able to see the bird's eye view image g1 when the identification image g13 is displayed, the identification image g13 may be displayed on the bird's eye view image g1 in an overlapping manner, in a mode that the bird's eye view image g1 can be seen through the identification image g13.

Figure 4C:
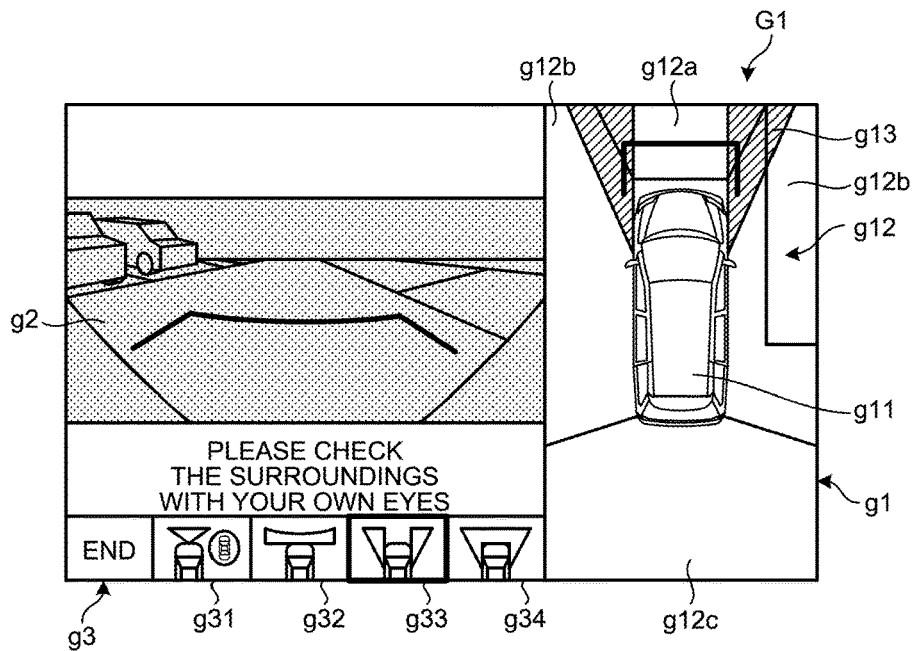
FIG. 4C is a diagram for explaining an example of the switching process of the captured image within the vehicle periphery monitoring screen to be displayed in the vehicle according to the first embodiment.
Figure 4D:
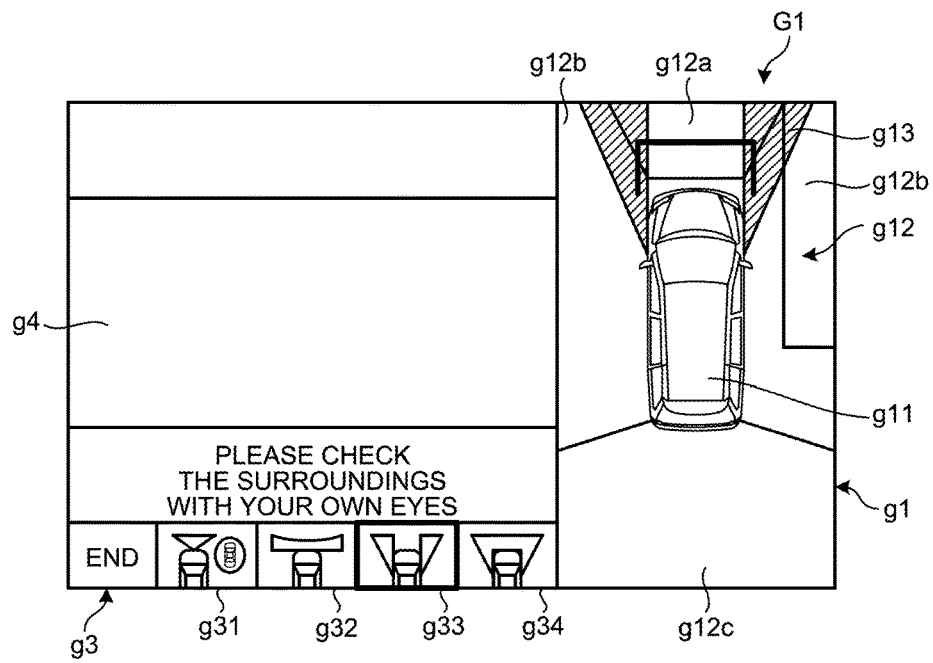
FIG. 4D is a diagram for explaining an example of the switching process of the captured image within the vehicle periphery monitoring screen to be displayed in the vehicle according to the first embodiment.

Moreover, as illustrated in FIG. 4D, the CPU 14a displays a black image g4 instead of the pre-switching image, prior to displaying the post-switching image, while displaying the bird's eye view image g1 on the vehicle periphery monitoring screen G1, during the time until the pre-switching image is switched to the post-switching image. Consequently, it is possible to continuously view the bird's eye view image g1 and view the timing at which the captured image g2 is switched, when the pre-switching image is switched to the post-switching image. Thus, the user can easily recognize whether the captured image g2 is switched. In the present embodiment, the CPU 14a continues to display the black image g4 for a predetermined period of time, prior to displaying the post-switching image. Consequently, the user can more easily recognize that the captured image g2 is switched.

Furthermore, as illustrated in FIG. 4C, the CPU 14a may gradually reduce the brightness of the pre-switching image, during the time until the black image g4 is displayed instead of the pre-switching image. In other words, the CPU 14a displays the black image g4 after causing the pre-switching image to fade out, during the time until the black image g4 is displayed instead of the pre-switching image. Consequently, it is possible to prevent the captured image g2 from being switched at a short interval. Thus, the user can easily recognize whether the captured image g2 is switched.

Then, as illustrated in FIG. 5B, when a predetermined time has elapsed since display of the black image g4 was started, the CPU 14a includes the post-switching image to the vehicle periphery monitoring screen G1 as the captured image g2. In the present embodiment, the CPU 14a continues to display the identification image g13 for a predetermined period of time, after including the post-switching image to the vehicle periphery monitoring screen G1 as the captured image g2 (in other words, after the pre-switching image is switched to the post-switching image). In this manner, it is possible to prevent the identification image g13 from immediately turning into a display-hidden state after the captured image g2 is switched. Thus, the user can identify whether the captured image g2 of the area selected by the user is displayed, after the captured image g2 is switched.

Figure 5A:
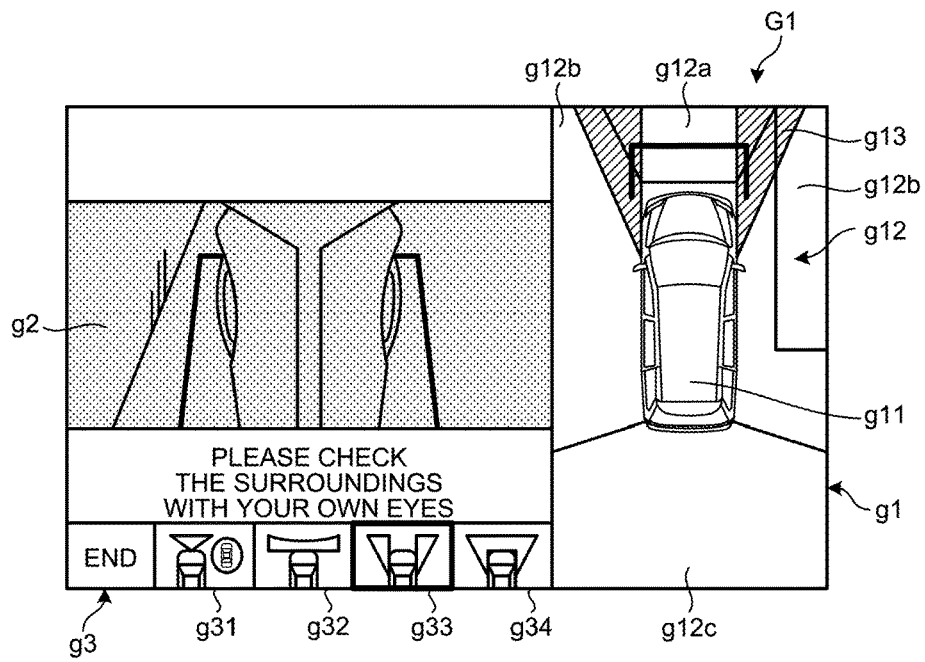
FIG. 5A is a diagram for explaining an example of a switching process of a captured image within the vehicle periphery monitoring screen to be displayed in the vehicle according to the first embodiment.
Figure 5B:
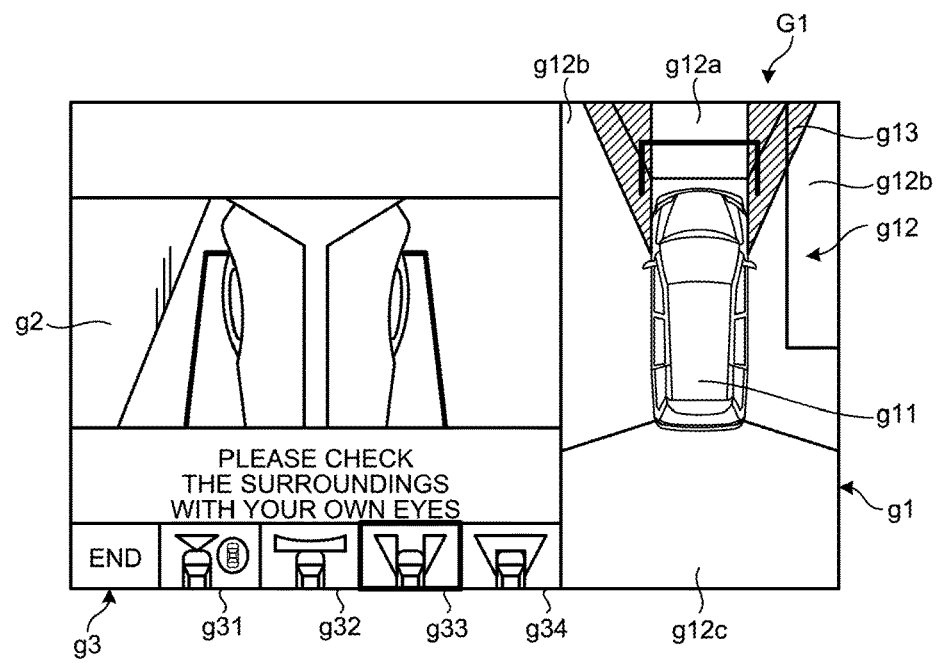
FIG. 5B is a diagram for explaining an example of the switching process of the captured image within the vehicle periphery monitoring screen to be displayed in the vehicle according to the first embodiment.

As illustrated in FIG. 5A, the CPU 14a may also gradually increase the brightness of the post-switching image, during the time until the post-switching image is displayed instead of the black image g4. In other words, the CPU 14a displays the post-switching image by causing the post-switching image to fade in, during the time until the post-switching image is displayed instead of the black image g4. In this manner, it is possible to prevent the captured image g2 from being switched in a short period of time. Thus, the user can easily recognize whether the captured image g2 is switched.

Figure 5C:
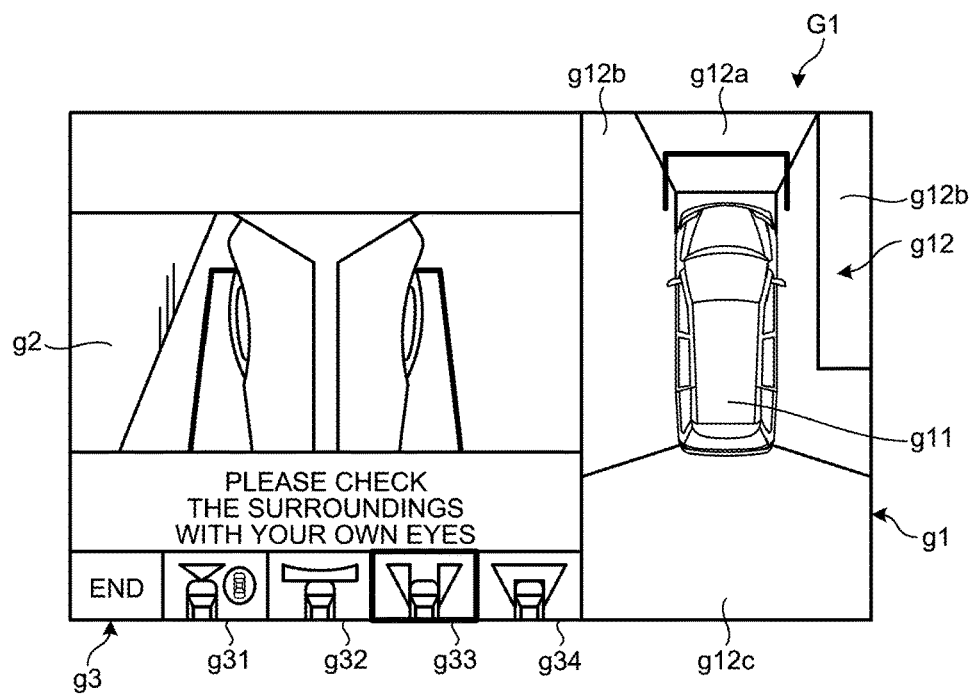
FIG. 5C is a diagram for explaining an example of the switching process of the captured image within the vehicle periphery monitoring screen to be displayed in the vehicle according to the first embodiment.
Figure 5D:
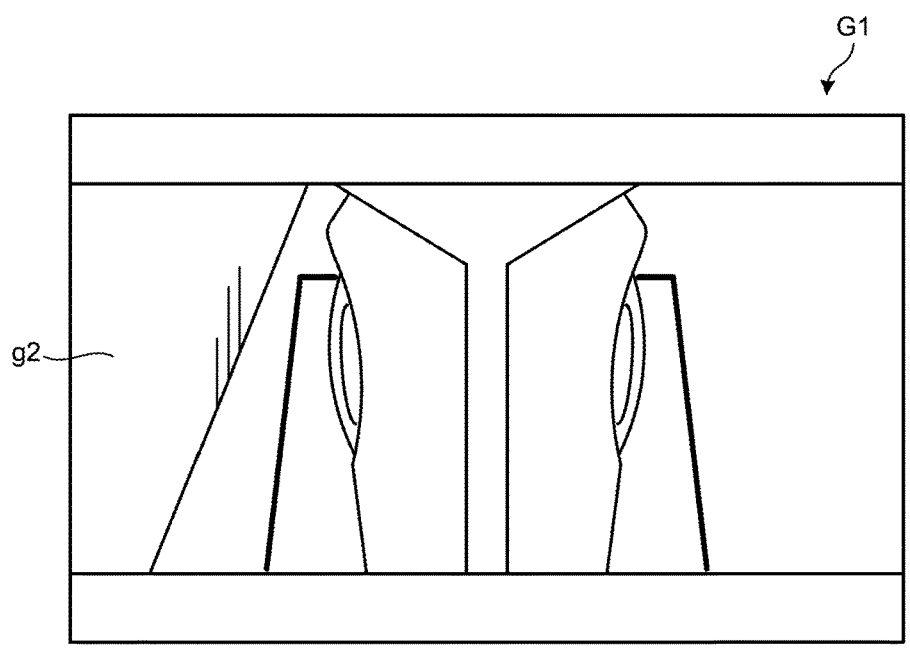
FIG. 5D is a diagram for explaining an example of the switching process of the captured image within the vehicle periphery monitoring screen to be displayed in the vehicle according to the first embodiment.

As illustrated in FIG. 5C, when a predetermined time has elapsed since display of the post-switching image was started, the CPU 14a turns the identification image g13 into a display-hidden state. The CPU 14a may also display an image for identifying the selection area that is currently displayed as the captured image g2 (in other words, display the identification image g13 again), when a touch operation on the captured image g2 is detected by the operation input unit 10, after the identification image g13 is turned into a display-hidden state. In this manner, it is possible to easily specify which area of the captured image g2 is to be displayed, by performing a touch operation on the captured image g2, even after the identification image g13 is turned into a display-hidden state. Moreover, as illustrated in FIG. 5D, the CPU 14a can make it possible for the user to more easily identify the post-switching image, by hiding the bird's eye view image g1 and the selection images g3 and displaying the post-switching image on the entire screen of the vehicle periphery monitoring screen G1. In the present embodiment, the CPU 14a changes the identification image g13 into a display-hidden state after a predetermined of time has elapsed, after switching of the pre-switching image to the post-switching image. However, it is not limited thereto, and for example, the CPU 14a may change the identification image g13 into a display-hidden state at the same time when the pre-switching image is switched to the post-switching image.

Next, a process of displaying the captured image g2 to be included in the vehicle periphery monitoring screen G1, by switching from a captured image of the front area (pre-switching image) to a captured image of the wide-angle area (post-switching image), will be described with reference to FIGS. 6A to 6D and FIGS. 7A to 7D. FIGS. 6A to 6D and FIGS. 7A to 7D are diagrams for explaining examples of a switching process of a captured image within the vehicle periphery monitoring screen to be displayed in the vehicle according to the first embodiment.

Figure 6A:
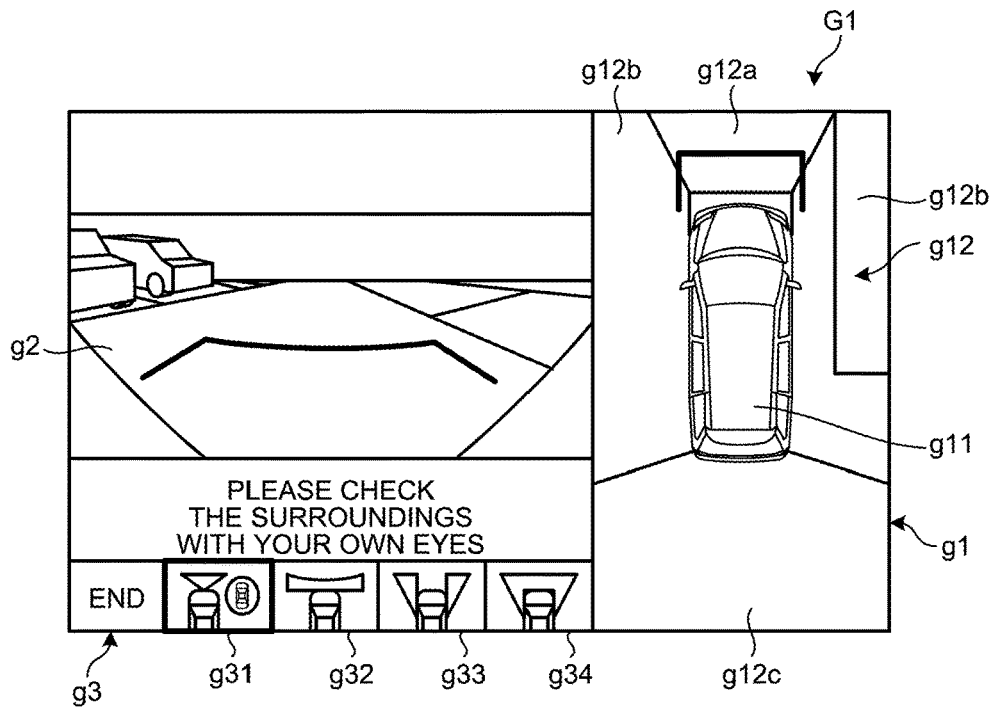
FIG. 6A is a diagram for explaining an example of a switching process of a captured image within the vehicle periphery monitoring screen to be displayed in the vehicle according to the first embodiment.
Figure 6B:
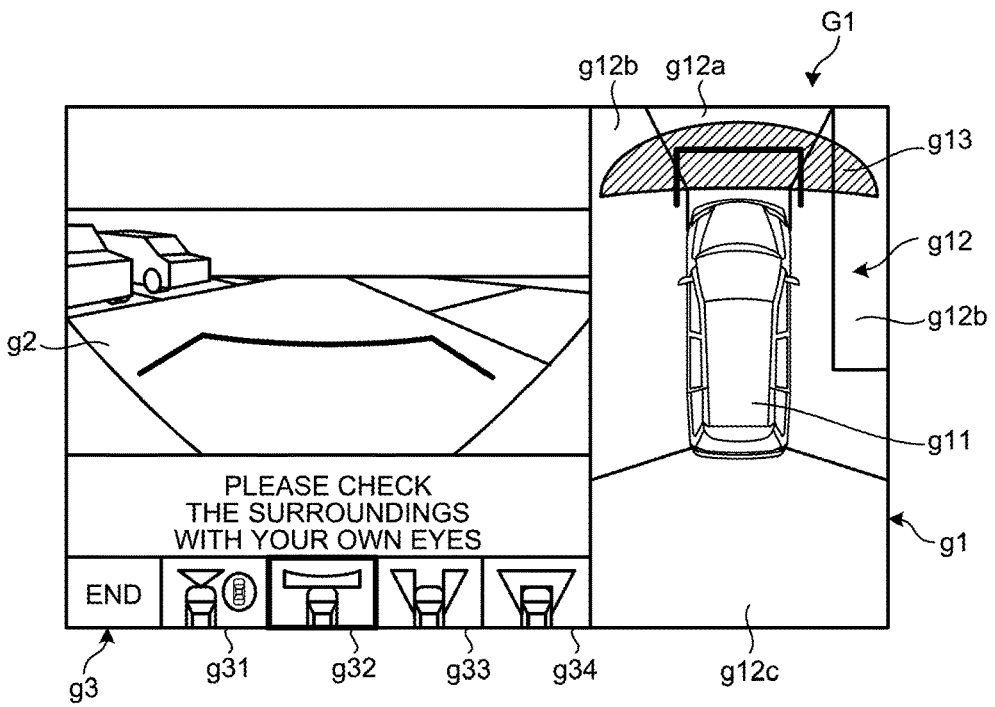
FIG. 6B is a diagram for explaining an example of the switching process of the captured image within the vehicle periphery monitoring screen to be displayed in the vehicle according to the first embodiment.

First, as illustrated in FIG. 6A, the CPU 14a displays the vehicle periphery monitoring screen G1 including the captured image g2 captured by the imaging unit 16a, on the display device 8. Then, as illustrated in FIG. 6B, when a touch operation on the selection image g32 is detected and the wide-angle area is selected as the selection area, the CPU 14a displays the identification image g13 in which the area corresponding to the wide-angle area in the peripheral image g12 has a different display mode from that of the other area, on the vehicle periphery monitoring screen G1 in an overlapping manner.

Figure 6C:
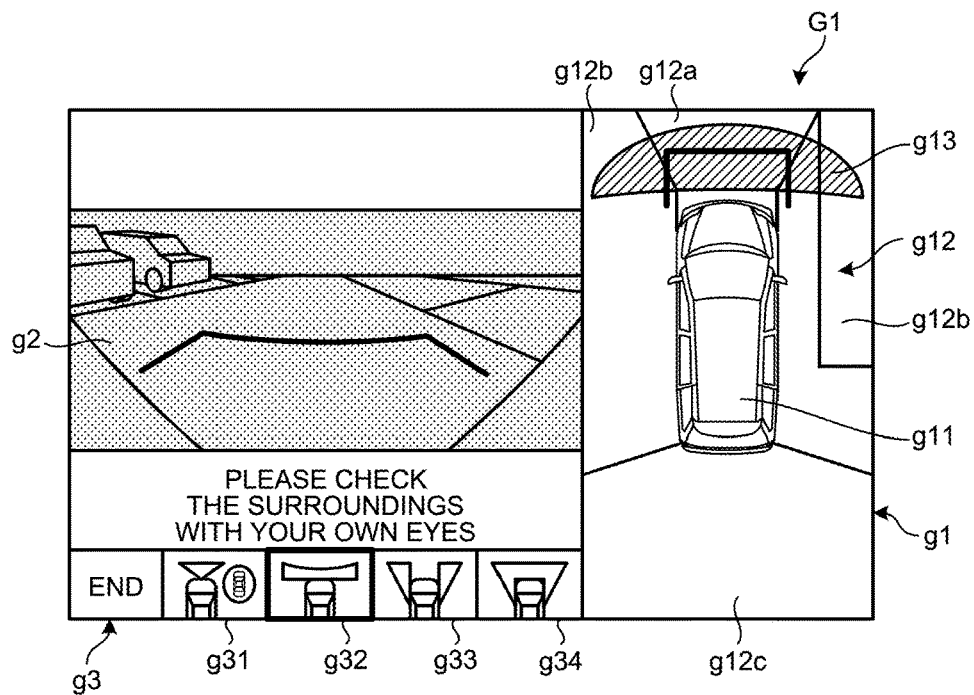
FIG. 6C is a diagram for explaining an example of the switching process of the captured image within the vehicle periphery monitoring screen to be displayed in the vehicle according to the first embodiment.
Figure 6D:
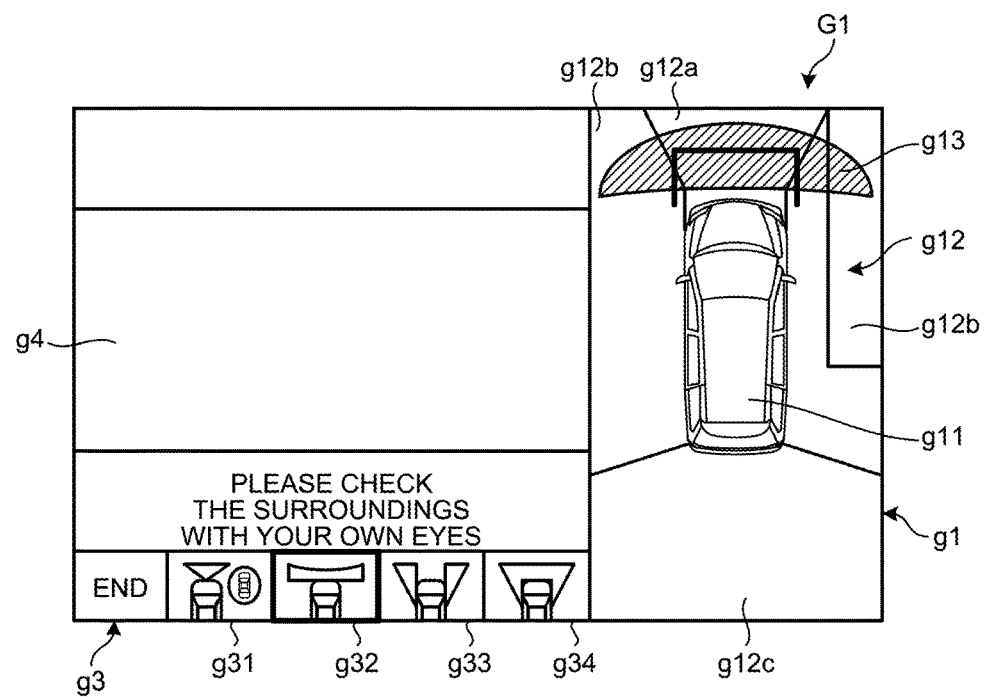
FIG. 6D is a diagram for explaining an example of the switching process of the captured image within the vehicle periphery monitoring screen to be displayed in the vehicle according to the first embodiment.

Then, as illustrated in FIG. 6D, the CPU 14a displays the black image g4 instead of the pre-switching image, for a predetermined period of time, while displaying the bird's eye view image g1 on the vehicle periphery monitoring screen G1, before the captured image g2 is switched. As illustrated in FIG. 6C, the CPU 14a may also gradually reduce the brightness of the pre-switching image, during the time until the black image g4 is displayed instead of the pre-switching image.

Figure 7A:
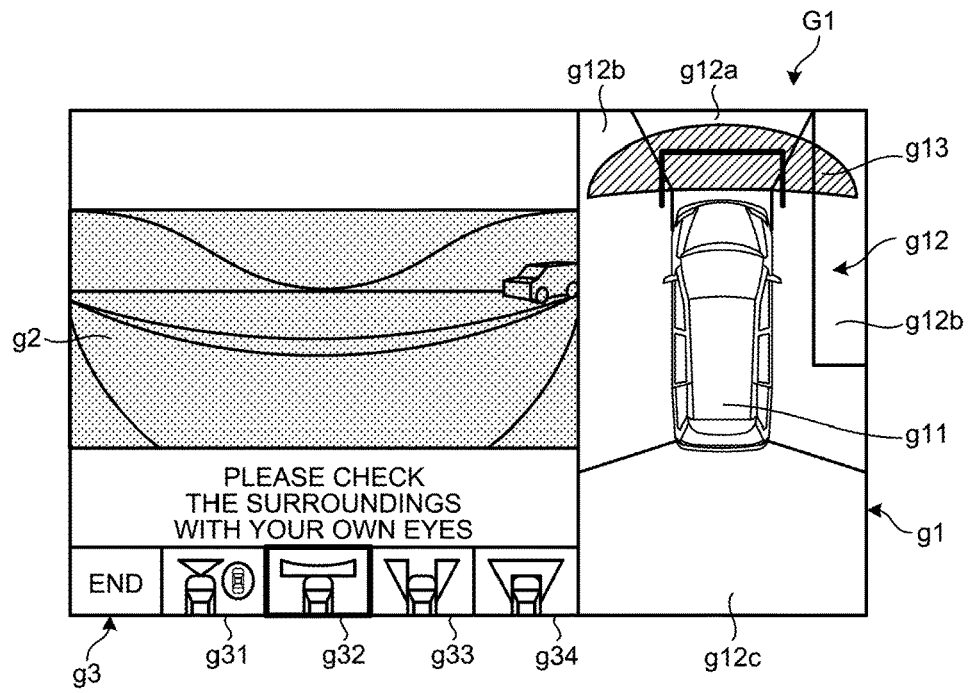
FIG. 7A is a diagram for explaining an example of a switching process of a captured image within the vehicle periphery monitoring screen to be displayed in the vehicle according to the first embodiment.
Figure 7B:
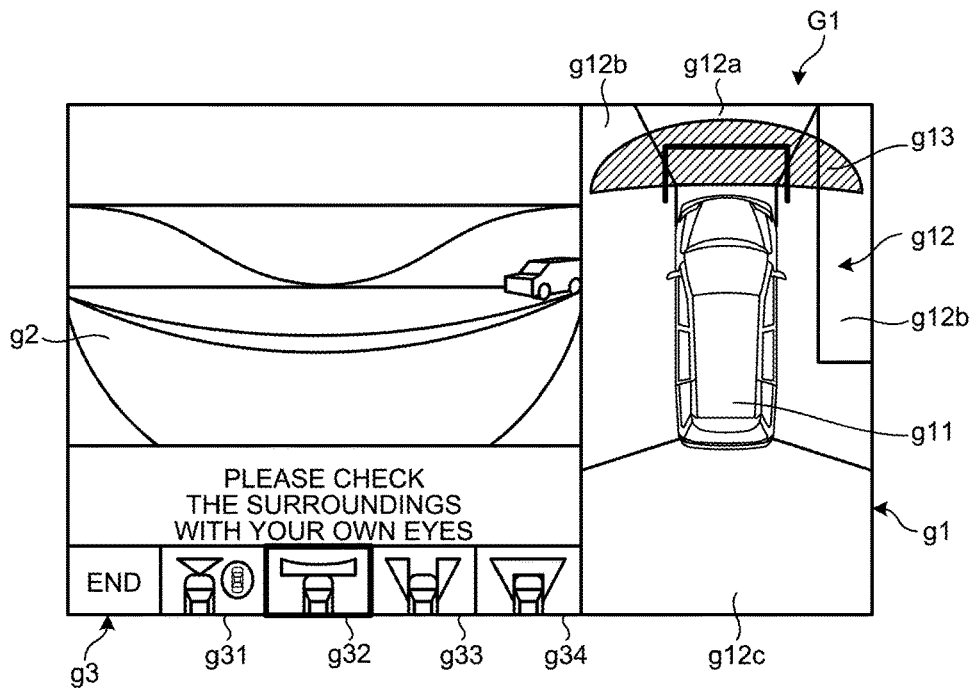
FIG. 7B is a diagram for explaining an example of the switching process of the captured image within the vehicle periphery monitoring screen to be displayed in the vehicle according to the first embodiment.

Next, as illustrated in FIG. 7B, when a predetermined time has elapsed since display of the black image g4 was started, the CPU 14a includes an image (post-switching image) of the wide-angle area captured by the imaging unit 16a, on the vehicle periphery monitoring screen G1 as the captured image g2. As illustrated in FIG. 7A, the CPU 14a may also gradually increase the brightness of the post-switching image, during the time until the post-switching image is displayed instead of the black image g4.

Figure 7C:
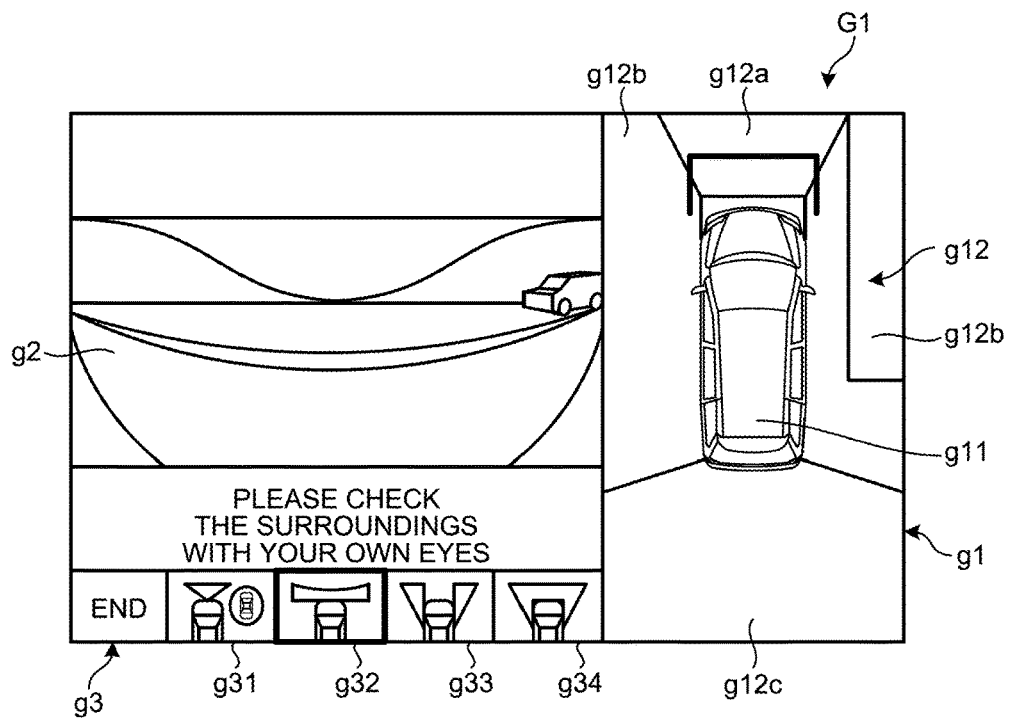
FIG. 7C is a diagram for explaining an example of the switching process of the captured image within the vehicle periphery monitoring screen to be displayed in the vehicle according to the first embodiment.
Figure 7D:
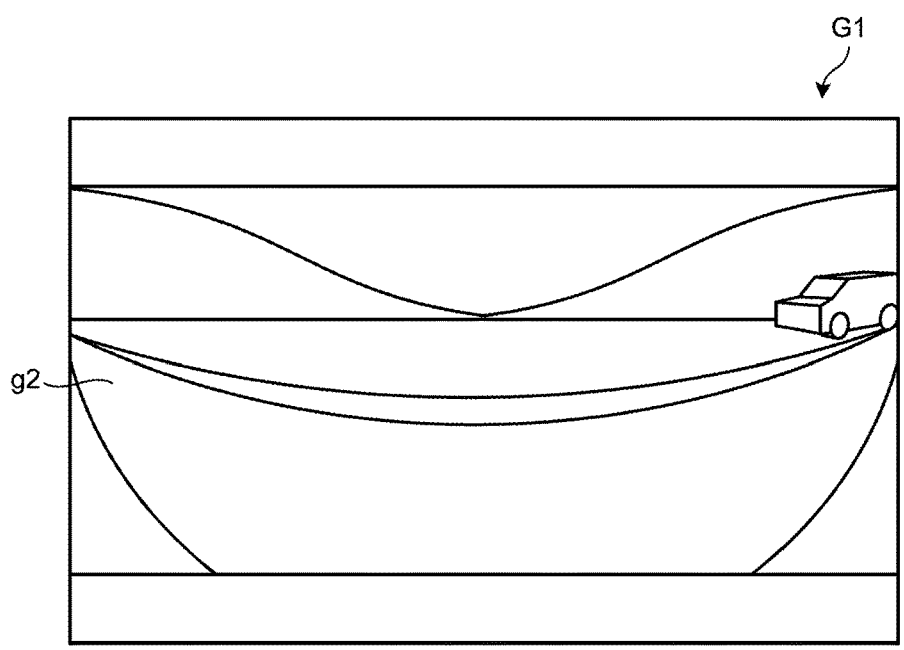
FIG. 7D is a diagram for explaining an example of the switching process of the captured image within the vehicle periphery monitoring screen to be displayed in the vehicle according to the first embodiment.

As illustrated in FIG. 7C, when a predetermined time has elapsed since display of the post-switching image was started, the CPU 14a turns the identification image g13 into a display-hidden state. In this process, as illustrated in FIG. 7D, the CPU 14a can make it possible for the user to more easily identify the post-switching image by hiding the bird's eye view image g1 and the selection images g3 and displaying the post-switching image on the entire screen of the vehicle periphery monitoring screen G1.

Next, a process of displaying the captured image g2 to be included in the vehicle periphery monitoring screen G1, by switching from a captured image of the front area (pre-switching image) to a captured image of the under-floor area (post-switching image), will be described with reference to FIGS. 8A to 8D and FIGS. 9A to 9D. FIGS. 8A to 8D and FIGS. 9A to 9D are diagrams for explaining examples of a switching process of a captured image within the vehicle periphery monitoring screen to be displayed in the vehicle according to the first embodiment.

Figure 8A:
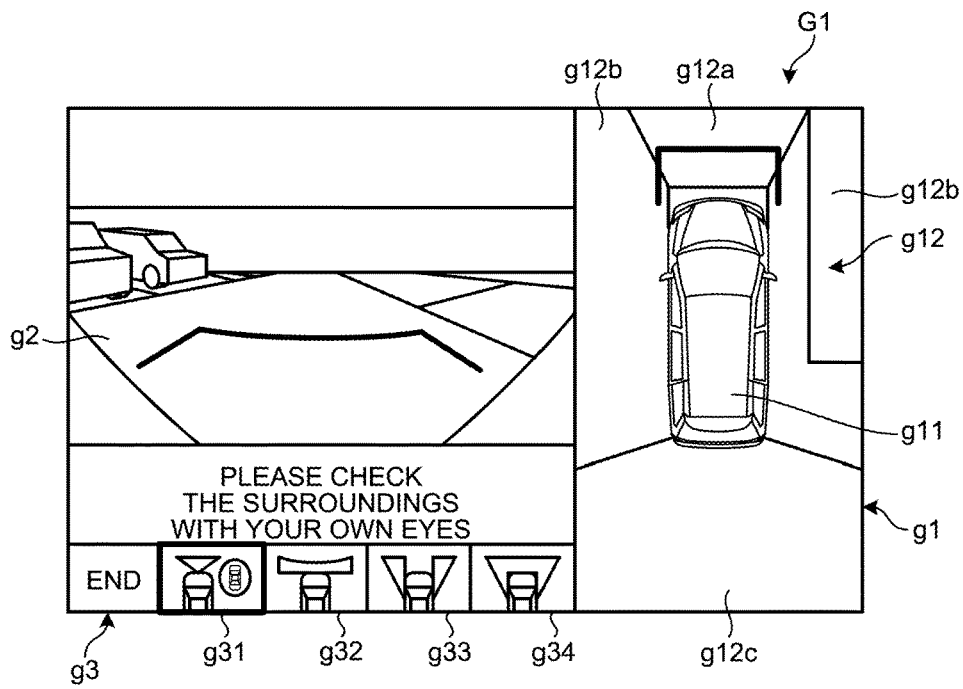
FIG. 8A is a diagram for explaining an example of a switching process of a captured image within the vehicle periphery monitoring screen to be displayed in the vehicle according to the first embodiment.
Figure 8B:
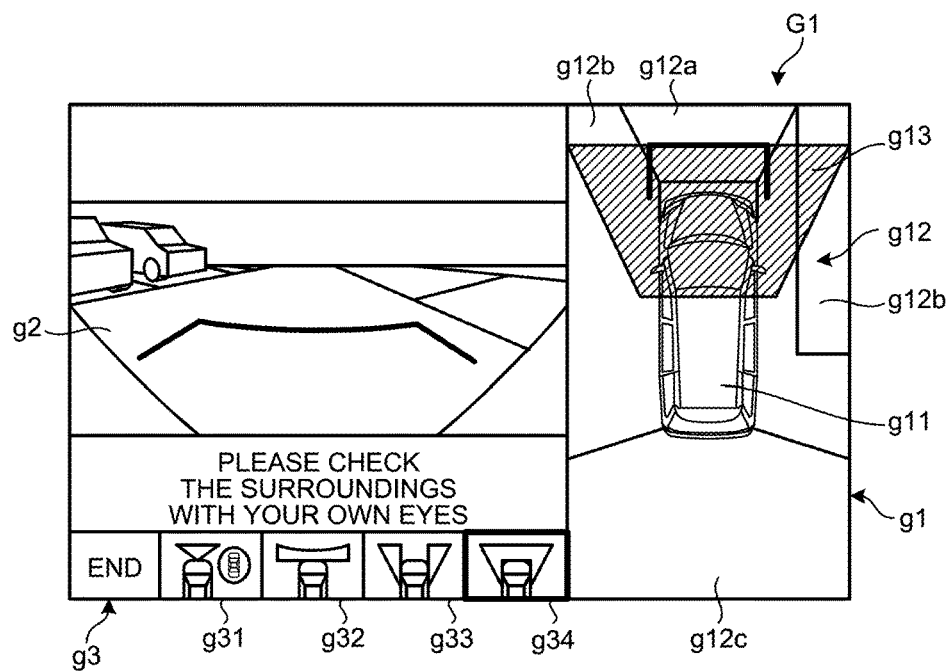
FIG. 8B is a diagram for explaining an example of the switching process of the captured image within the vehicle periphery monitoring screen to be displayed in the vehicle according to the first embodiment.

First, as illustrated in FIG. 8A, the CPU 14a is displaying the vehicle periphery monitoring screen G1 including the captured image g2 captured by the imaging unit 16a, on the display device 8. Then, as illustrated in FIG. 8B, when a touch operation on the selection image g34 is detected and the under-floor area is selected as the selection area, the CPU 14a displays the identification image g13 in which the area corresponding to the under-floor area in the peripheral image g12 has a different displaying mode from that of the other area, on the vehicle periphery monitoring screen G1 in an overlapping manner.

Figure 8C:
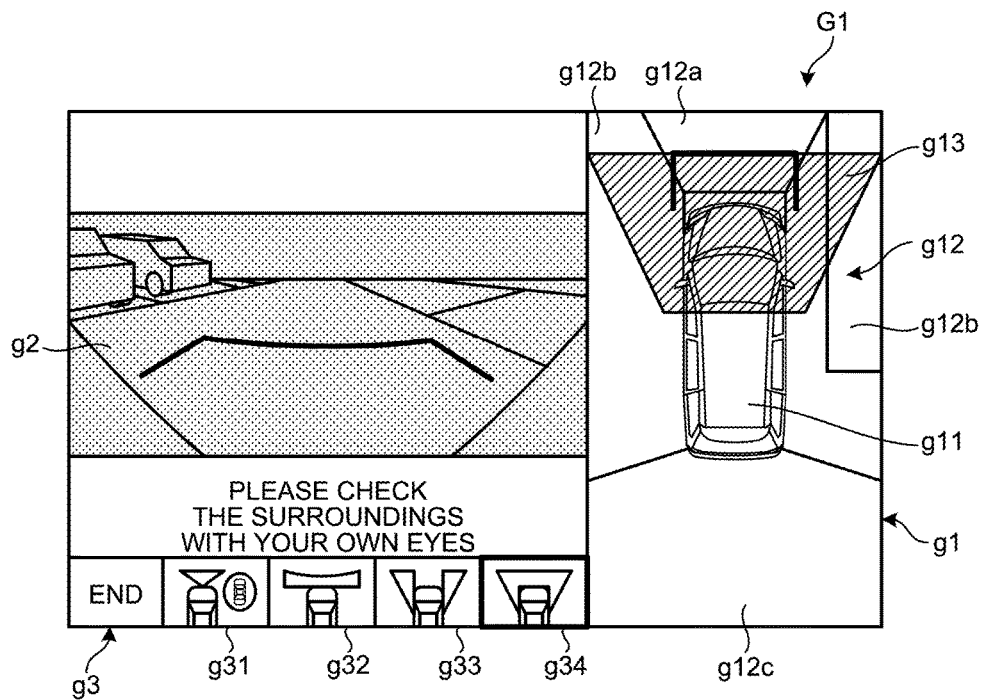
FIG. 8C is a diagram for explaining an example of the switching process of the captured image within the vehicle periphery monitoring screen to be displayed in the vehicle according to the first embodiment.
Figure 8D:
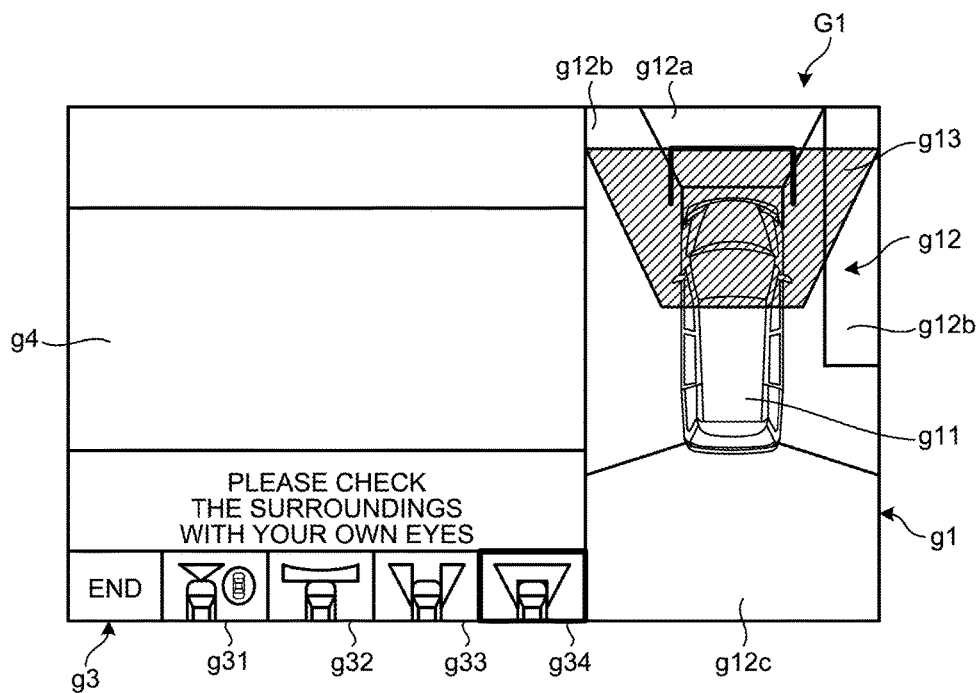
FIG. 8D is a diagram for explaining an example of the switching process of the captured image within the vehicle periphery monitoring screen to be displayed in the vehicle according to the first embodiment.

Then, as illustrated in FIG. 8D, the CPU 14a displays the black image g4 instead of the pre-switching image for a predetermined period of time, while displaying the bird's eye view image g1 on the vehicle periphery monitoring screen G1, before the captured image g2 is switched. As illustrated in FIG. 8C, the CPU 14a may also gradually reduce the brightness of the pre-switching image, during the time until the black image g4 is displayed instead of the pre-switching image.

Figure 9A:
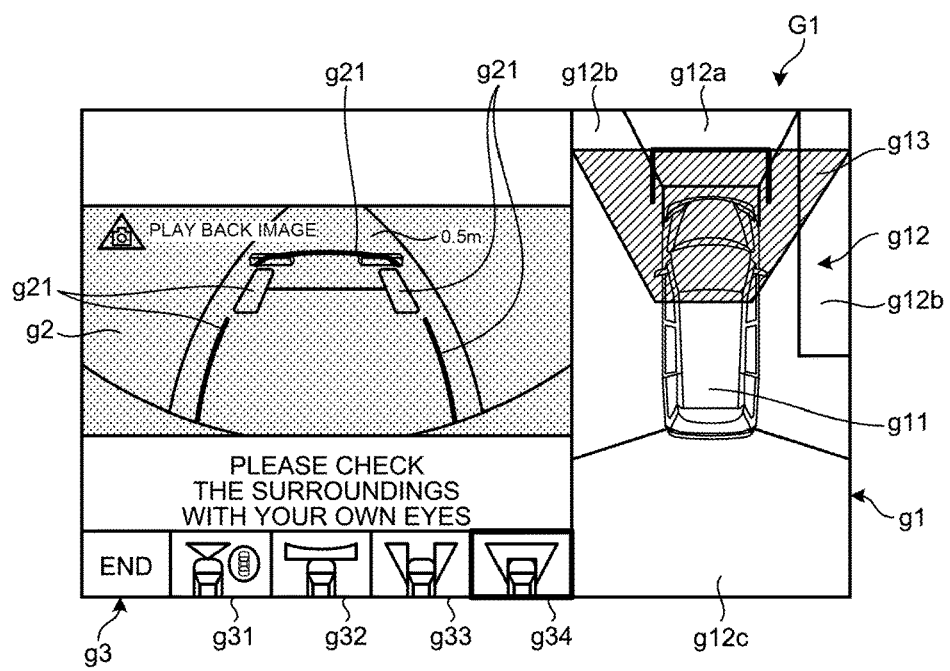
FIG. 9A is a diagram for explaining an example of a switching process of a captured image within the vehicle periphery monitoring screen to be displayed in the vehicle according to the first embodiment.
Figure 9B:
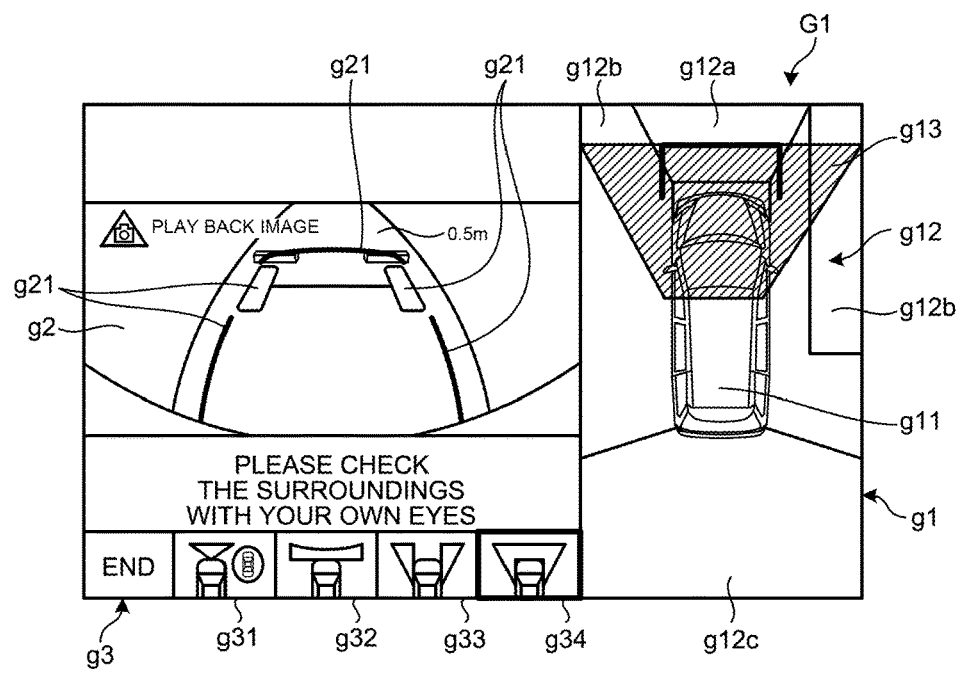
FIG. 9B is a diagram for explaining an example of the switching process of the captured image within the vehicle periphery monitoring screen to be displayed in the vehicle according to the first embodiment.

Next, as illustrated in FIG. 9B, when a predetermined time has elapsed since display of the black image g4 was started, the CPU 14a includes an image captured by the imaging unit 16e (post-switching image) in the vehicle periphery monitoring screen G1, as the captured image g2. Moreover, as illustrated in FIG. 9A, the CPU 14a gradually increases the brightness of the post-switching image, during the time until the post-switching image is displayed instead of the black image g4. In the present embodiment, the image captured by the imaging unit 16e is displayed as a captured image of the under-floor area. However, it is not limited thereto, and for example, an image of the front area captured by the imaging unit 16a may be stored, the viewpoint of the stored image is converted into an image of the under-floor area viewed from above in real time, and the converted image may be displayed. In this manner, compared to the image obtained by directly capturing the image of under the floor, the image of the front of the vehicle 1 captured by the imaging unit 16a can display the road surface state of a wider under-floor area that is not hidden by the tires of the vehicle 1. Moreover, as illustrated in the captured image g2 of FIGS. 9A to 9D, by displaying an index g21 indicating a tire of the vehicle 1 and the outside of the vehicle 1 in an overlapping manner, the user can easily recognize which area of image in the under-floor area of the vehicle 1 is being displayed.

Figure 9C:
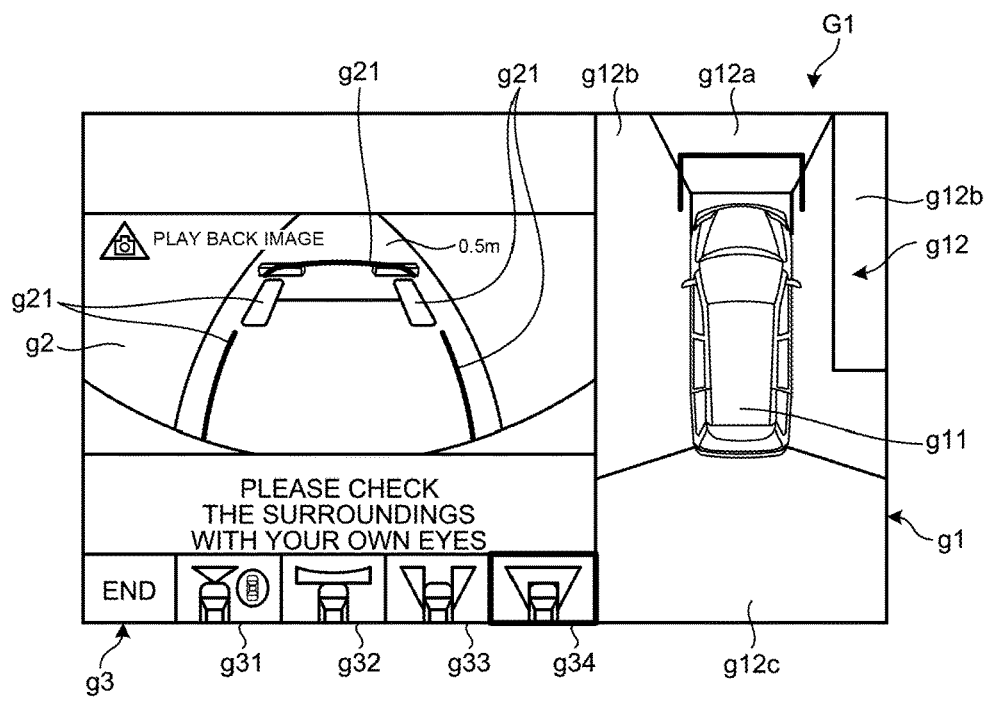
FIG. 9C is a diagram for explaining an example of the switching process of the captured image within the vehicle periphery monitoring screen to be displayed in the vehicle according to the first embodiment.
Figure 9D:
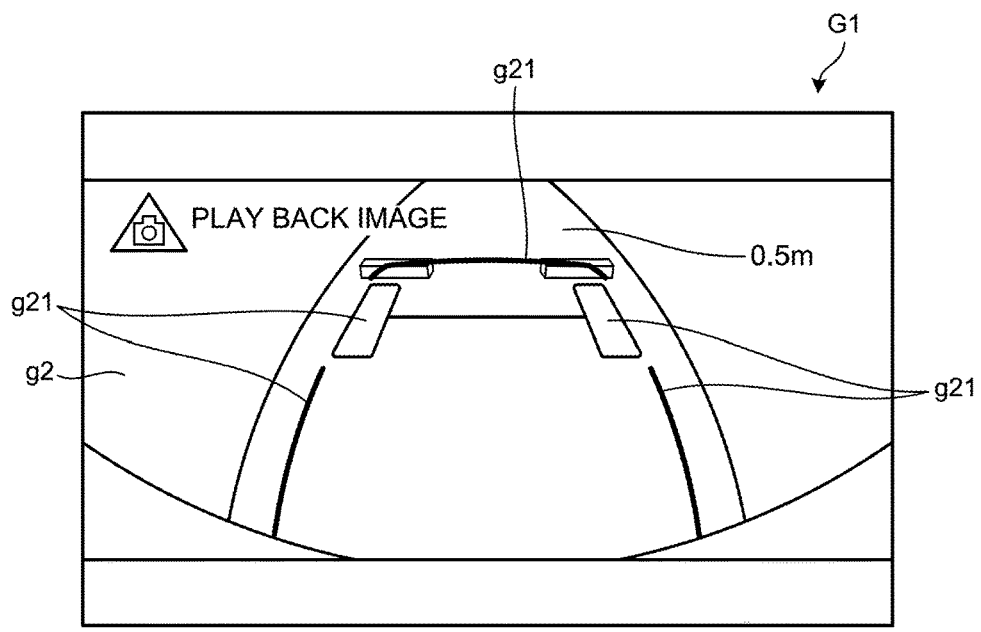
FIG. 9D is a diagram for explaining an example of the switching process of the captured image within the vehicle periphery monitoring screen to be displayed in the vehicle according to the first embodiment.

Then, as illustrated in FIG. 9C, when a predetermined time has elapsed since display of the post-switching image was started, the CPU 14a turns the identification image g13 into a display-hidden state. In this process, as illustrated in FIG. 9D, the CPU 14a can also make it possible for the user to more easily identify the post-switching image by hiding the bird's eye view image g1 and the selection images g3 into a display-hidden state and displaying the image after being displayed on the entire screen of the vehicle periphery monitoring screen G1.

In this manner, with the vehicle 1 of the first embodiment, the user can easily identify which area of the next image is going to be displayed by displaying the identification image g13 during the time until the pre-switching image is switched to the post-switching image.

Second Embodiment

The present embodiment is an example of using a vehicle image included in the vehicle periphery monitoring screen as a selection image for selecting the selection area. In the following explanation, description of the same portions as those in the first embodiment will be omitted.

Figure 10A:
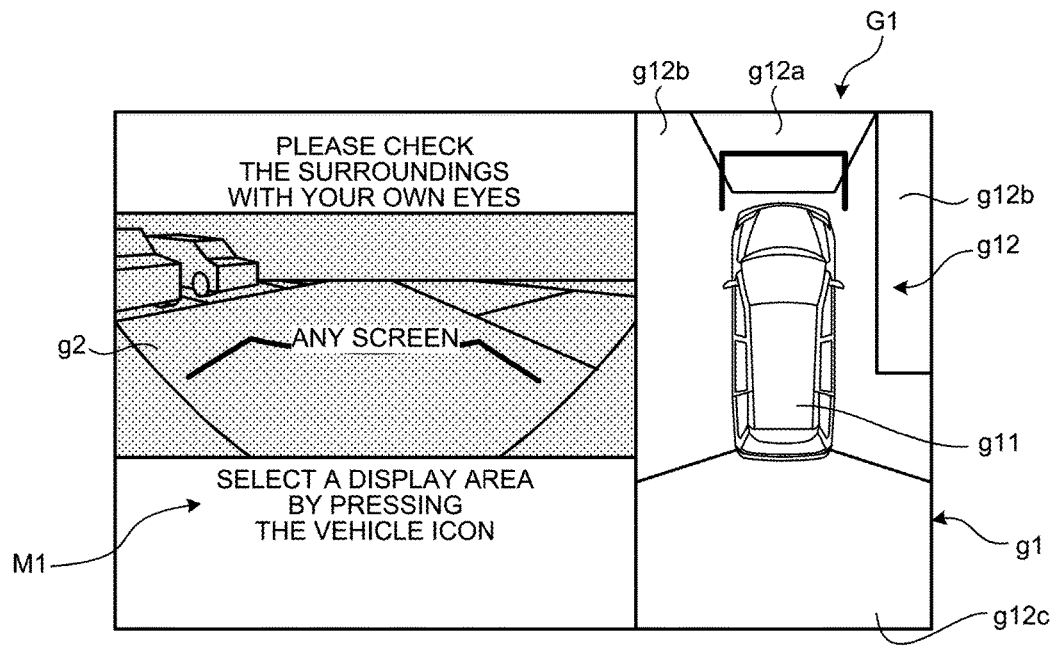
FIG. 10A is a diagram for explaining an example of a vehicle periphery monitoring screen to be displayed in a vehicle according to a second embodiment.

FIGS. 10A to 10E, FIG. 11A to FIG. 11E, and FIGS. 12A to 12C are diagrams for explaining examples of a vehicle periphery monitoring screen to be displayed in a vehicle according to a second embodiment. In the present embodiment, as illustrated in FIG. 10A, the CPU 14a displays the vehicle periphery monitoring screen G1 including a message M1 (for example, "please select display area by pressing the vehicle icon") indicating that the selection area can be selected by using the vehicle image g11 in addition to the bird's eye view image g1 and the captured image g2, on the display device 8.

Figure 10B:
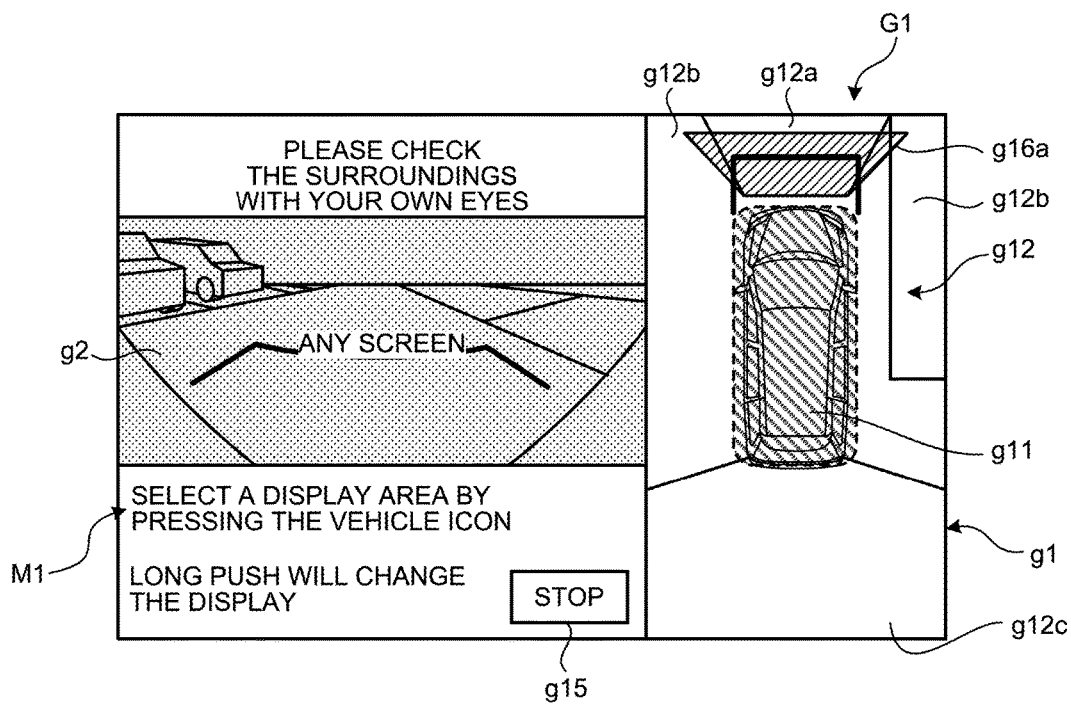
FIG. 10B is a diagram for explaining an example of the vehicle periphery monitoring screen to be displayed in the vehicle according to the second embodiment.
Figure 10C:
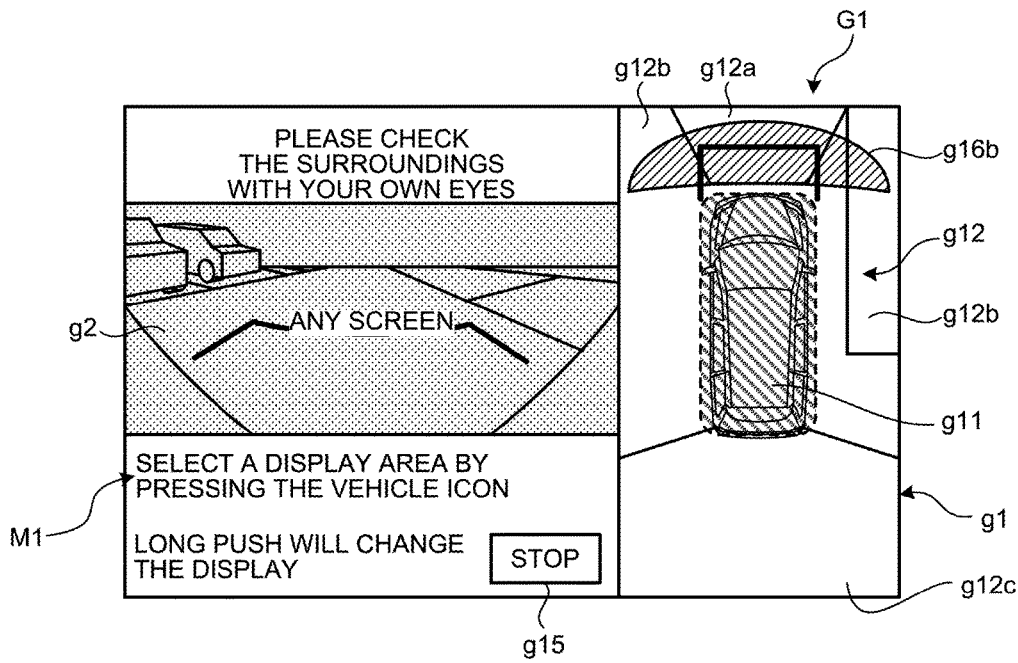
FIG. 10C is a diagram for explaining an example of the vehicle periphery monitoring screen to be displayed in the vehicle according to the second embodiment.
Figure 10D:
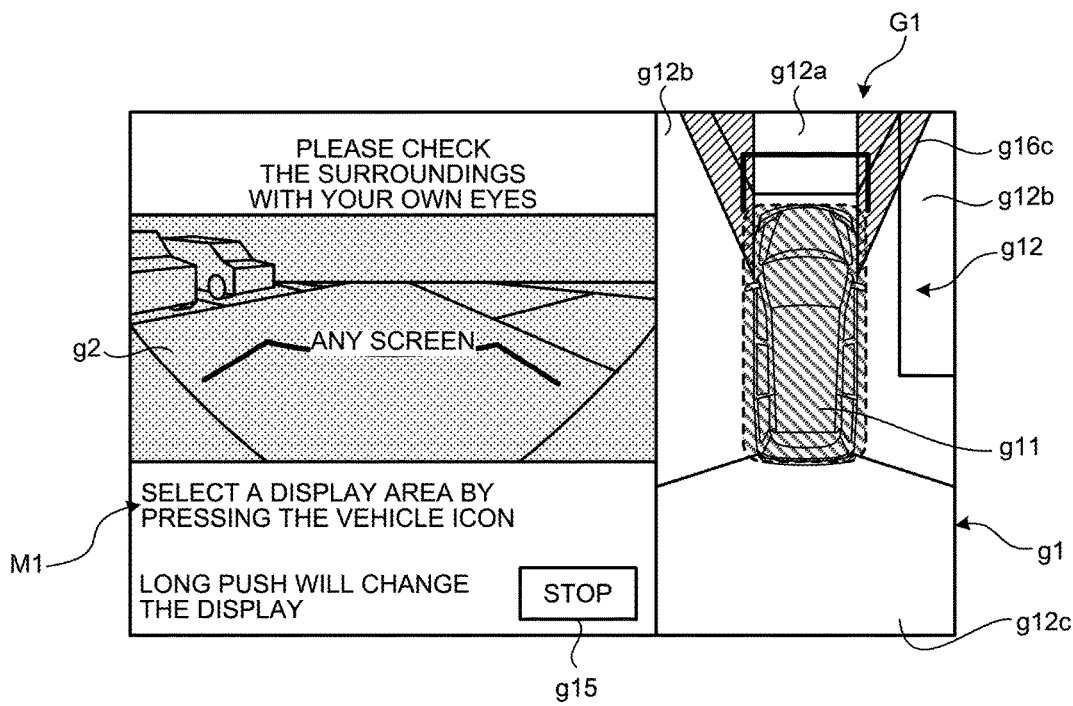
FIG. 10D is a diagram for explaining an example of the vehicle periphery monitoring screen to be displayed in the vehicle according to the second embodiment.
Figure 10E:
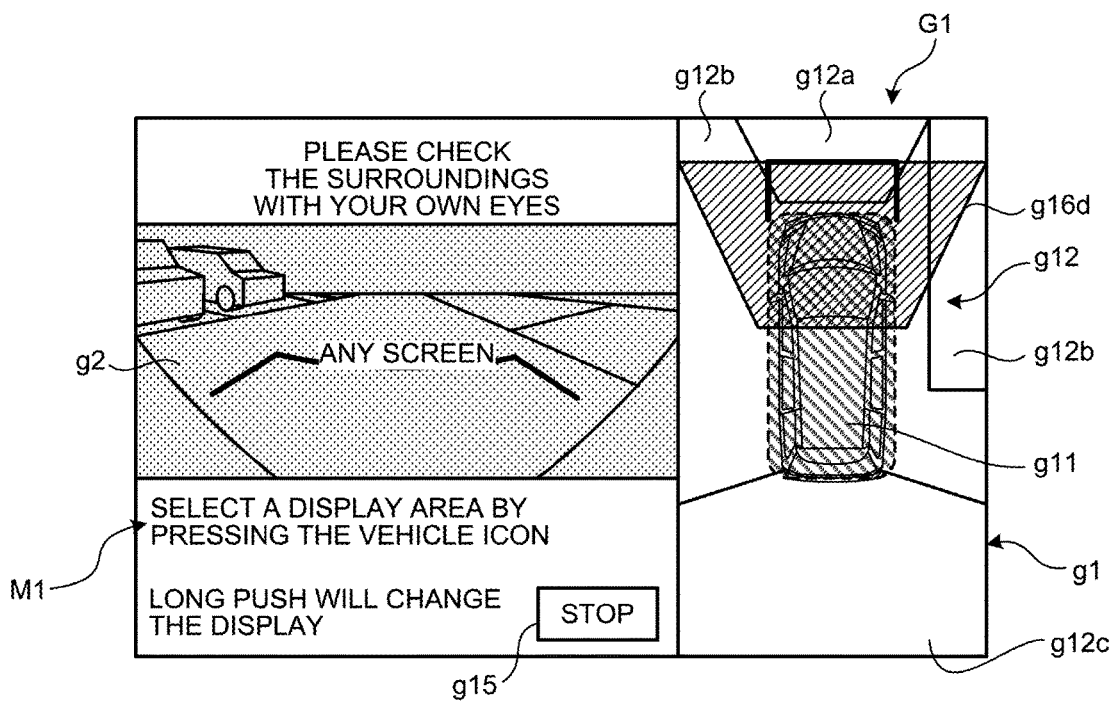
FIG. 10E is a diagram for explaining an example of the vehicle periphery monitoring screen to be displayed in the vehicle according to the second embodiment.

Then, as illustrated in FIG. 10B, when a touch operation on the vehicle image g11 is detected by the operation input unit 10, the CPU 14a changes the display mode of the vehicle image g11 to a predetermined display mode (for example, a flickering state and a highlight display). The CPU 14a can also switchably display a plurality of candidate area images g16 corresponding to a plurality of respective candidate areas that can be selected as the selection area (in the present embodiment, the front area, the wide-angle area, the side areas, and the under-floor area) in a predetermined order, on the bird's eye view image g1, every time a touch operation on the vehicle image g11 is detected by the operation input unit 10. In this example, each of the candidate area images g16 is an image in which the display mode of the area corresponding to the candidate area in the peripheral image g12 is different from that of the other area (for example, a flickering state and a highlight display). In the present embodiment, the CPU 14a also switchably displays a candidate area image g16a corresponding to the front area, a candidate area image g16b corresponding to the wide-angle area, a candidate area image g16c corresponding to the side areas, and a candidate area image g16d corresponding to the under-floor area, as the candidate area images g16.

In the present embodiment, as illustrated in FIGS. 10A to 10E and FIGS. 11A to 11c, the CPU 14a switchably displays the candidate area image g16a, the candidate area image g16b, the candidate area image g16c, and the candidate area image g16d in this order. In the present embodiment, the candidate area images g16 are switchably displayed every time a touch operation on the vehicle image g11 is detected by the operation input unit 10. However, it is not limited thereto, and for example, the candidate area images g16 may be switchably displayed, every time a touch operation on the captured image g2 is detected, or every time a swipe operation is detected by the operation input unit 10. Alternatively, the CPU 14a may switch the candidate area image g16 to be displayed among the candidate area images g16, on the basis of the direction of a swipe operation detected by the operation input unit 10. Moreover, in the present embodiment, the candidate area images g16 are switchably displayed on the basis of a touch operation detected by a touch panel that is an example of the operation input unit 10. However, the candidate area images g16 may be switchably displayed, on the basis of a cyclic operation on a hardware switch that is installed on a dashboard, at the vicinity of an instrument panel, on a steering, and the like.

Figure 11A:
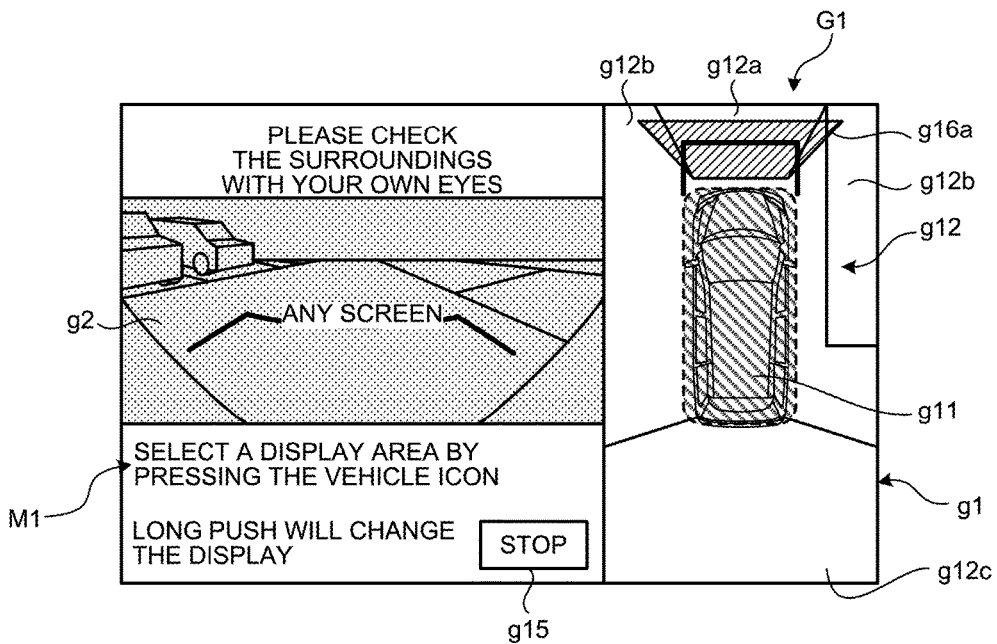
FIG. 11A is a diagram for explaining an example of a vehicle periphery monitoring screen to be displayed in the vehicle according to the second embodiment.
Figure 11B:
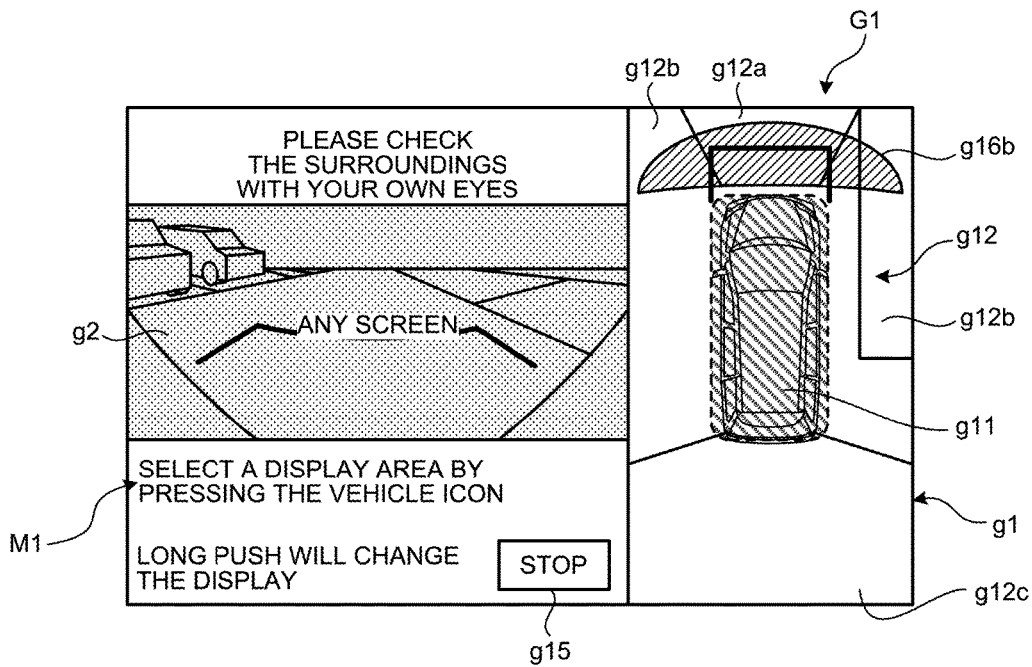
FIG. 11B is a diagram for explaining an example of the vehicle periphery monitoring screen to be displayed in the vehicle according to the second embodiment.
Figure 11C:
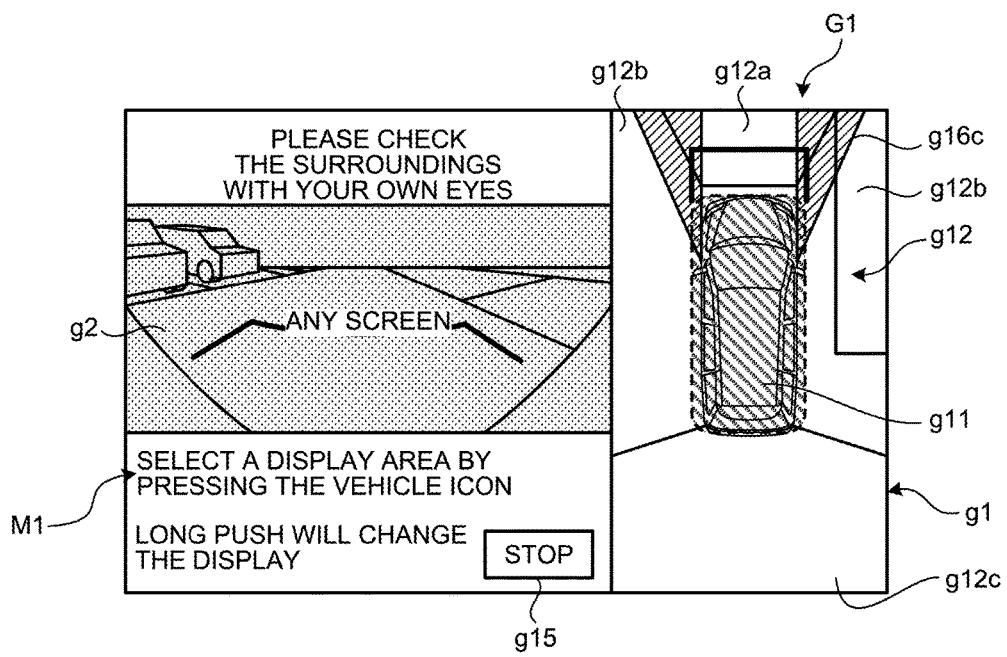
FIG. 11C is a diagram for explaining an example of the vehicle periphery monitoring screen to be displayed in the vehicle according to the second embodiment.
Figure 11D:
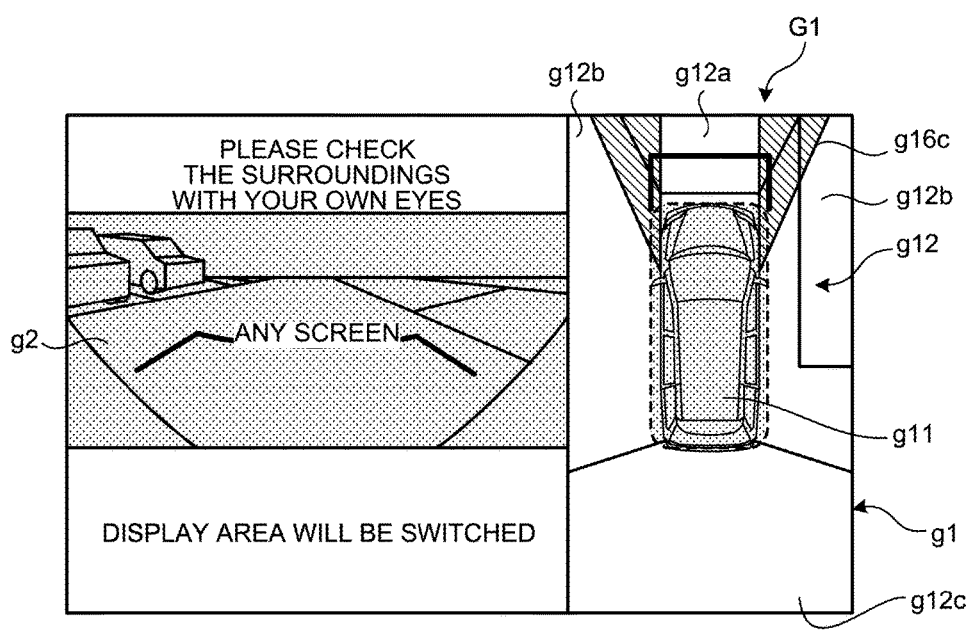
FIG. 11D is a diagram for explaining an example of the vehicle periphery monitoring screen to be displayed in the vehicle according to the second embodiment.
Figure 11E:
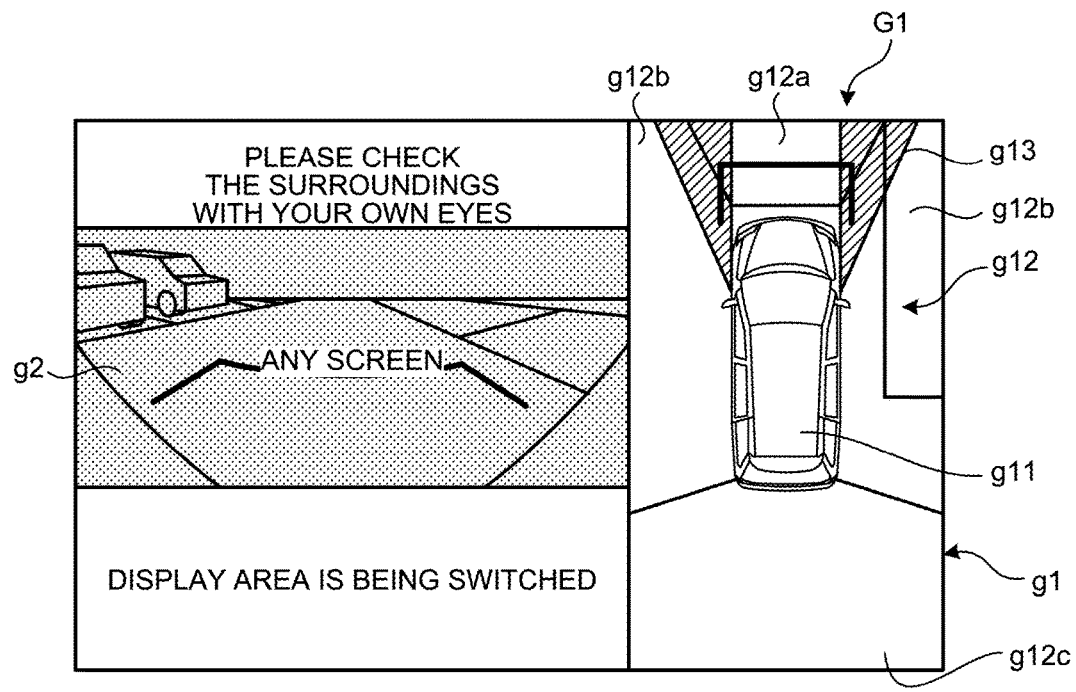
FIG. 11E is a diagram for explaining an example of the vehicle periphery monitoring screen to be displayed in the vehicle according to the second embodiment.

Then, as illustrated in FIG. 11D, when a touch operation on the candidate area image g16 (for example, candidate area image g16c) is detected by the operation input unit 10, the CPU 14a determines that a candidate selection area (for example, the side areas) corresponding to the candidate area image g16 on which the touch operation is detected, is selected as the selection area. Alternatively, when a long push on the vehicle image g11 is detected by the operation input unit 10, the CPU 14a may determine that the candidate selection area corresponding to the last displayed candidate area image g16 is selected as the selection area. Then, as illustrated in FIG. 11E, similar to the first embodiment, the CPU 14a includes a captured image of the selection area (post-switching image) in the vehicle periphery monitoring screen G1 as the captured image g2. As illustrated in FIG. 11E, similar to the first embodiment, the CPU 14a also displays the identification image g13 in the bird's eye view image g1 in an overlapping manner, before the pre-switching image is switched to the post-switching image.

Figure 12A:
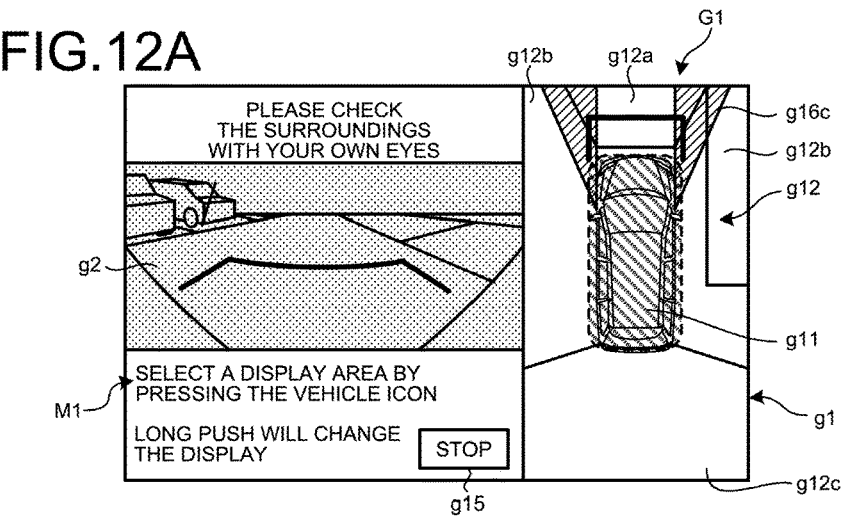
FIG. 12A is a diagram for explaining an example of a vehicle periphery monitoring screen to be displayed in the vehicle according to the second embodiment.
Figure 12B:
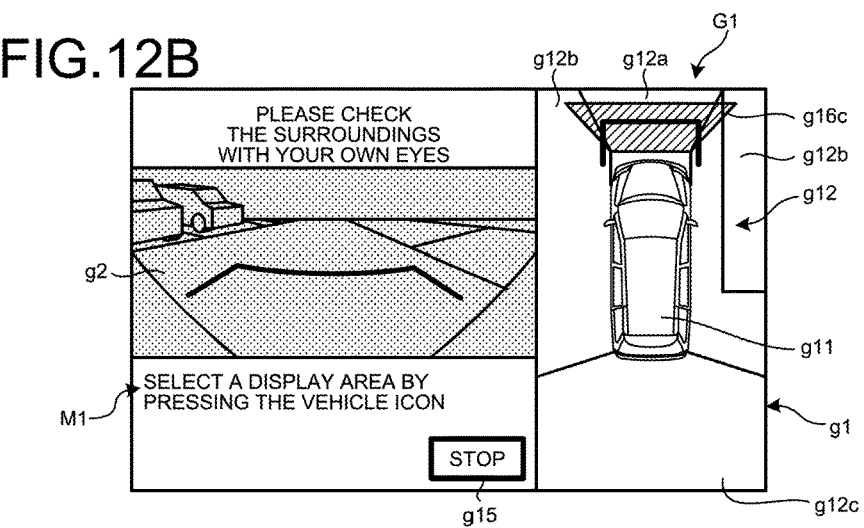
FIG. 12B is a diagram for explaining an example of the vehicle periphery monitoring screen to be displayed in the vehicle according to the second embodiment.
Figure 12C:
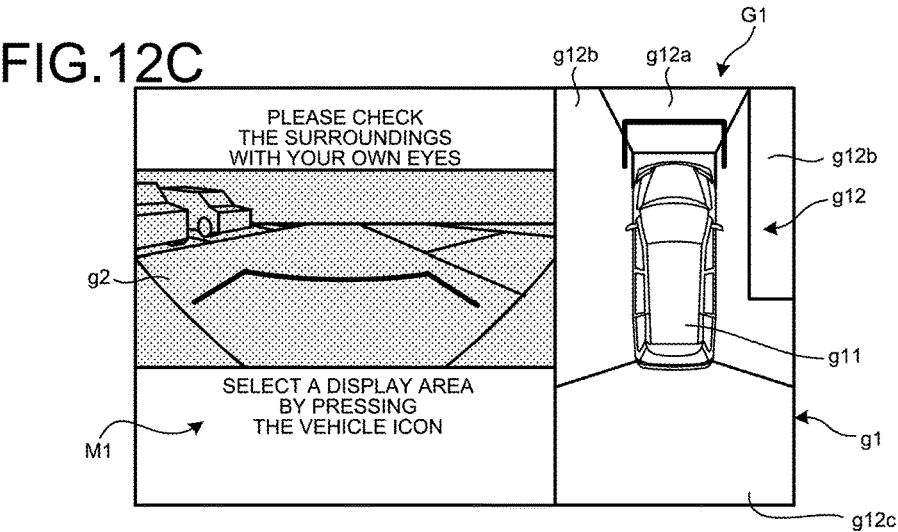
FIG. 12C is a diagram for explaining an example of the vehicle periphery monitoring screen to be displayed in the vehicle according to the second embodiment.

On the other hand, as illustrated in FIG. 12A and FIG. 12B, when a touch operation on a stop button g15 for instructing to stop selecting the selection area is detected by the operation input unit 10 while the candidate area images g16 are switchably displayed, as illustrated in FIG. 12C, the CPU 14a returns the display mode of the vehicle image g11 to the original display mode, and causes the selection area to be in an unselectable state.

In this manner, with the vehicle 1 according to the second embodiment, the candidate area images g16 are switchably displayed by performing a touch operation on the vehicle image g11 included in the bird's eye view image g1, and the selection area can be selected by performing a touch operation on the candidate area image g16. Consequently, the user can intuitively perform an operation of selecting a selection area.

As described above, with the first and the second embodiments, the user can easily identify which area of the next image is going to be displayed, by displaying the identification image g13 during the time until the pre-switching image is switched to the post-switching image.

While some embodiments of the present invention have been described, it is to be understood that these embodiments are merely presented as examples, and are not intended to limit the scope of the invention. These novel embodiments may be carried out in various other forms, and various omissions, substitutions, and changes may be made without departing from the spirit of the invention. These embodiments and their modifications as would fall within the scope and spirit of the invention are included in the invention and the scope of their equivalents as set forth in the claims.

The invention claimed is:

1. An image display control device, comprising:
   a display; and
   a controller that
   displays a first screen on the display, the first screen including a first image and a second image, the first image being an image of a vehicle viewed from above, and the second image obtained by capturing a second area that is a part of a first area where is a capturing target around the vehicle;

displays, on the display, a third image that is switched from the second image, the third image being obtained by capturing a third area where is different from the second area, the third area being selected as a part of area included in the first area;

displays identification information for identifying the third area within the first image, before the second image is switched to the third image; and changes the identification information into a display-hidden state at a same time when the second image is switched to the third image or at a time when a predetermined time has elapsed after the second image is switched to the third image.

2. The image display control device according to claim 1, wherein the controller keeps displaying the first image on the first screen and displays a black image instead of the second image prior to the third image during a time until the second image is switched to the third image.

3. The image display control device according to claim 2, wherein the controller gradually reduces brightness of the second image until the black image is displayed, and gradually increases brightness of the third image after the black image is displayed.

4. The image display control device according to claim 1, wherein the identification information is information to be displayed in an area of the first image corresponding to the third area in an overlapping manner.

5. An image display control device, comprising:
a display; and
a controller that
displays a first screen on the display, the first screen including a first image and a second image, the first image being an image of a vehicle viewed from above, and the second image obtained by capturing a second area that is a part of a first area where is a capturing target around the vehicle;

displays, on the display, a third image that is switched from the second image, the third image being obtained by capturing a third area where is different from the second area, the third area being selected as a part of area included in the first area;

displays identification information for identifying the third area within the first image, before the second image is switched to the third image;

keeps displaying the first image on the first screen and displays a black image instead of the second image prior to the third image during a time until the second image is switched to the third image; and gradually reduces brightness of the second image until the black image is displayed, and gradually increases brightness of the third image after the black image is displayed.

6. An image display control device, comprising:
a display; and
a controller that
displays a first screen on the display, the first screen including a first image and a second image, the first image being an image of a vehicle viewed from above, and the second image obtained by capturing a second area that is a part of a first area where is a capturing target around the vehicle;

when an operation is detected, displays identification information for identifying a third area on the first image in an overlapping manner, the third area being selected as a part of an area included in the first area and being different from the second area; and after the identification information is displayed to the first image in an overlapping manner, displays, on the display, a third image that is switched from the second image, the third image being obtained by capturing the third area;

wherein the controller displays the first screen including a plurality of selection images, and displays, when a touch operation on one of the selection images is performed, the identification information on the first area in an overlapping manner; and wherein the selection images include at least one of a selection image for selecting a front area that is an area in front of the vehicle, a selection image for selecting a wide-angle area that is an area wider than the front area, a selection image for selecting side areas that are left and right areas of the vehicle, and a selection image for selecting an under-floor area that is an area under a floor of the vehicle.

* * * * *